United States Patent
Ito et al.

(10) Patent No.: US 8,689,212 B2
(45) Date of Patent: Apr. 1, 2014

(54) INFORMATION PROCESSING DEVICE FOR CONTROLLING AN APPLICATION ABLE TO ACCESS A PREDETERMINED DEVICE, AND CONTROL METHOD USING AN INFORMATION PROCESSING DEVICE FOR CONTROLLING AN APPLICATION ABLE TO ACCESS A PREDETERMINED DEVICE

(75) Inventors: Takayuki Ito, Osaka (JP); Manabu Maeda, Osaka (JP); Tomoyuki Haga, Nara (JP); Hisashi Takayama, Osaka (JP); Hideki Matsushima, Osaka (JP)

(73) Assignee: Panasonic Corporation, Osaka (JP)

( * ) Notice: Subject to any disclaimer, the term of this patent is extended or adjusted under 35 U.S.C. 154(b) by 888 days.

(21) Appl. No.: 12/918,918

(22) PCT Filed: Feb. 9, 2009

(86) PCT No.: PCT/JP2009/000500
§ 371 (c)(1),
(2), (4) Date: Aug. 23, 2010

(87) PCT Pub. No.: WO2009/107330
PCT Pub. Date: Mar. 9, 2009

(65) Prior Publication Data
US 2013/0212575 A1    Aug. 15, 2013

(30) Foreign Application Priority Data
Feb. 25, 2008 (JP) ................................. 2008-043009

(51) Int. Cl.
*G06F 9/455* (2006.01)
*G06F 7/04* (2006.01)
*G06F 21/00* (2013.01)
*G06F 21/30* (2013.01)

(52) U.S. Cl.
CPC ............ *G06F 9/45533* (2013.01); *G06F 21/00* (2013.01); *G06F 21/30* (2013.01)
USPC ................ 718/1; 726/2; 726/3; 726/4; 726/5; 726/16; 726/17; 726/21

(58) Field of Classification Search
None
See application file for complete search history.

(56) References Cited

U.S. PATENT DOCUMENTS 7,035,850 B2 * 4/2006 Arai et al. ............................. 1/1
8,146,167 B2 * 3/2012 Inooka et al. .................... 726/27

(Continued)

FOREIGN PATENT DOCUMENTS

| EP | 1 528 474 | 5/2005 |
|----|-----------|--------|
| JP | 2001-175486 | 6/2001 |

(Continued)

OTHER PUBLICATIONS

Supplementary European Search Report issued Jan. 8, 2013 in European Patent Application No. EP 09 71 5484.3.

(Continued)

*Primary Examiner* — Qing Wu
(74) *Attorney, Agent, or Firm* — Wenderoth, Lind & Ponack, L.L.P.

(57) ABSTRACT

An information processing device verifies the authorization of an application that has issued an access request to access a device. When an application on a universal OS issues a processing request to a secure device driver, a secure VMM and an application identification unit on a management dedicated OS lock a page table of the application and refer to the page table to generate a hash value. The application is determined to be authorized or unauthorized by comparing the generated hash value with a reference hash value.

12 Claims, 23 Drawing Sheets

(56) References Cited

U.S. PATENT DOCUMENTS

| | | | |
|---|---|---|---|
| 2001/0025311 A1 | 9/2001 | Arai et al. | |
| 2005/0097298 A1 | 5/2005 | Cohen | |
| 2005/0223377 A1* | 10/2005 | Galal et al. | 718/1 |
| 2006/0047958 A1 | 3/2006 | Morais | |
| 2006/0064697 A1 | 3/2006 | Kagi et al. | |
| 2007/0226736 A1 | 9/2007 | Johnson et al. | |
| 2008/0005297 A1 | 1/2008 | Kjos et al. | |
| 2012/0036508 A1 | 2/2012 | Johnson et al. | |

FOREIGN PATENT DOCUMENTS

| | | |
|---|---|---|
| JP | 2001-337864 | 12/2001 |
| JP | 2003-186561 | 7/2003 |
| JP | 2006-65847 | 3/2006 |
| JP | 2007-500381 | 1/2007 |
| WO | 2005/015390 | 2/2005 |
| WO | 2007/109484 | 9/2007 |

OTHER PUBLICATIONS

R.S. Sandhu et al., "Access Control: Principles and Practice", IEEE Communications Magazine, IEEE Service Center, Piscataway, U.S., vol. 32, No. 9, pp. 40-48, XP000476554, ISSN: 0163-6804, DOI: 10.1109/35.312842, pp. 40-43, Sep. 1, 1994.

International Search Report issued Mar. 24, 2009 in International (PCT) Application No. PCT/JP2009/000500.

TCG Specification Architecture Overview, Specification Revision 1.4, Aug. 2, 2007.

TPM Main Part 1 Design Principles, Specification Version 1.2 Level 2 Revision 103, Jul. 9, 2007.

TPM Main Part 2 TPM Structures, Specification Version 1.2 Level 2 Revision 103, Jul. 9, 2007.

TPM Main Part 3 Commands, Specification Version 1.2 Level 2 Revision 103, Jul. 9, 2007.

* cited by examiner

FIG. 5

| Page number (161) | Logical address number (162) | Virtual physical address number (163) | Privilege information (164) | Writable/ non-writable information (165) | Readable/ non-readable information (166) | Other information (167) |
|---|---|---|---|---|---|---|
| 2 | 0x0000 1000 | 0x0000 0000 | Ring 3 | Writable | Readable | ⋮ |
| K | ⋮ | ⋮ | ⋮ | ⋮ | ⋮ | ⋮ |
| ⋮ | ⋮ | ⋮ | ⋮ | ⋮ | ⋮ | ⋮ |
| N | 0x1000 1000 | 0x0100 0000 | Ring 3 | Non-writable | Readable | ⋮ |

Page table 160

FIG. 6

| Privileged mode of CPU | Access to Ring 0 | Access to Ring 1 | Access to Ring 2 | Access to Ring 3 | Allocated software |
|---|---|---|---|---|---|
| Ring 0 | Permitted | Permitted | Permitted | Permitted | Secure VMM |
| Ring 1 | Denied | Permitted | Permitted | Permitted | Management dedicated OS |
| Ring 2 | Denied | Denied | Permitted | Permitted | Universal OS |
| Ring 3 | Denied | Denied | Denied | Permitted | Applications running on universal OS |

| Page number 301 | Logical address number 302 | Virtual physical address number 303 | Privilege information 304 | Writable/ non-writable information 305 | Readable/ non-readable information 306 | Other information 307 |
|---|---|---|---|---|---|---|
| 2 | 0x0000 1000 | 0x0000 0000 | Ring 0 | Non-writable | Readable | ... |
| K | ... | ... | ... | ... | ... | ... |
| ... | ... | ... | ... | ... | ... | ... |
| N | 0x1000 1000 | 0x0100 0000 | Ring 0 | Non-writable | Readable | ... |

Page table 300

INFORMATION PROCESSING DEVICE FOR CONTROLLING AN APPLICATION ABLE TO ACCESS A PREDETERMINED DEVICE, AND CONTROL METHOD USING AN INFORMATION PROCESSING DEVICE FOR CONTROLLING AN APPLICATION ABLE TO ACCESS A PREDETERMINED DEVICE

TECHNICAL FIELD

The present invention relates to an information processing device that includes a virtual machine monitor that manages a virtual machine on which an application operates and to a method for controlling the information processing device.

BACKGROUND ART

In recent years, consumer products are starting to digitalize audio data and incorporate the data in a storage device in order for consumers to enjoy music. Furthermore, there is a demand for consumer products to incorporate not only audio data, but also highly expressive content such as High Definition (HD) video.

Digitalized audio data, HD video, etc. can be copied with no loss of quality. Therefore, in order to protect the interests of copyright holders, such content needs to be protected from illicit copying.

Such content is protected, therefore, by copyright protection technology such as CPRM (Content Protection Recoding Media) or AACS (Advanced Access Content System). These copyright protection technologies protect content by encrypting it, and for users to enjoy content, it is necessary to decrypt the data with a terminal supporting the copyright protection technology.

A terminal supporting the copyright protection technology is provided with a secure device such as an encryption engine that decrypts encrypted content. The secure device needs to be operated properly so that content is not decrypted via illicit processing.

Tampering detection is a form of technology for determining whether a program performing the secure device operation is authorized or not (for example, Patent Literature 1).

Patent Literature 1 is technology for detecting whether a program that handles data is authorized or not. This technology is briefly described with reference to FIG. 19, which shows a sequence in Patent Literature 1.

First, processing begins via operation by, for example, a user (S410).

Next, the program processes input data and outputs processed information (S411).

Next, a hash value (authentication code) is created using a hash function for the program (S412).

Next, the processed information and the hash value (authentication code) are transferred to a verification unit not shown in FIG. 19. If the hash values match, the verification unit determines that the program corresponding to the hash value is authorized (S413).

Processing then ends (S414).

Patent Literature 2, for example, is technology for appropriately processing data handled by a terminal device. This technology is briefly described with reference to FIGS. 20 and 21.

FIG. 20 is a software schematic diagram of Patent Literature 2.

The software in Patent Literature 2 is composed of a Virtual Machine Monitor (VMM) 400, universal OS 401, network compatible application 402, universal OS NIC proxy 403, real-time OS 404, real-time NIC proxy 405, real-time UDP/IP 406, and NIC driver 407.

The VMM 400 provides an OS virtualization function. The universal OS 401 and the real-time OS 404 are the operating system on which the hardware virtualized by the VMM 400 operates.

When performing network processing, the network compatible application 402 requests network processing of the universal OS NIC proxy 403. The universal OS NIC proxy 403 requests processing of the real-time NIC proxy 405. The real-time NIC proxy 405 requests processing of the real-time UDP/IP 406 406. The real-time UDP/IP 406 uses the NIC driver 407 to control a Network Interface Card (NIC) not shown in FIG. 20.

Also when performing network processing, the real-time UDP/IP 406 uses the NIC driver 407 to control an NIC.

FIG. 21 shows a sequence when receiving notification of arrival of packet data from the NIC.

A notification of arrival of packet data is transmitted via an interrupt signal or the like from the NIC, which has detected the arrival of packet data (S400).

Next, the NIC driver 407 receives data from the NIC and transmits packet data to the real-time UDP/IP 406 (S401).

The real-time UDP/IP 406 determines whether the number stored in the port area of the packet data is the port number that the software in the real-time OS uses. If the number is the port number that the software in the real-time OS uses, processing proceeds to S403. If the number is not the number that the software in the real-time OS uses, processing proceeds to S404 (S402).

In S403, the real-time UDP/IP 406 transmits the packet data to appropriate software in the real-time OS, and processing proceeds to S405 (S403).

In step S404, the real-time UDP/IP 406 transmits the packet data to the universal OS NIC proxy 403 via the real-time NIC proxy 405. The universal OS NIC proxy 403 transmits the packet data to the network compatible application 402 (S404).

Processing then ends (S405).

[Patent Literature 1] Japanese Patent Application Publication No. 2003-186561 (Page 8, FIG. 1, etc.).

[Patent Literature 2] Tokuhyo (published Japanese translation of PCT international publication for patent application) No. 2007-500381 (Page 17, FIG. 1, etc.).

SUMMARY OF INVENTION

However, the above-described conventional technology leads to the following problems.

In the method in Patent Literature 1, hash calculation is performed on the program to determine whether the program is authorized.

This method, however, has the problem that if an authorized program is replaced by an unauthorized program, and the unauthorized program operates, it will be determined to be an authorized program.

This problem is briefly described with reference to FIG. 19.

First, in S411, an unauthorized program performs processing. Before proceeding from S411 to S412, the unauthorized program replaces an authorized program. Processing then proceeds to S412.

In S412, a hash value (authentication code) for the replacement of the authorized program is generated. Accordingly, it is determined that processing has been performed by an authorized program.

Furthermore, the method in Patent Literature 2 only determines whether the data that the device handles is to be processed by software on the real-time OS, or by software on the universal OS. This method does not verify whether the application is authorized.

Therefore, even when the network compatible application 402 has to use a secure transmission method such as SSL (Secure Socket Layer), there is a problem in that it is possible for unauthorized software to operate on the universal OS 401 and transmit without SSL.

In order to solve the above problems, it is an aim of the present invention to provide an information processing device and control method thereof which, after determining whether an application is authorized, prevent the application from being overwritten by an unauthorized application that controls a device.

To solve the above-described conventional problems, an information processing device according to the present invention comprises: a virtual machine operable to cause an application, which accesses a predetermined device, to operate in a work area; a detection unit operable to detect, from the virtual machine, an access request to access the predetermined device via the application; a verification unit operable to verify authorization of the application; and a virtual machine monitor operable to manage the virtual machine, the verification unit, and the detection unit and to switch between managing the application in one of a writeable state and a non-writable state, wherein upon detecting the access request, the detection unit notifies the virtual machine monitor of the detection, upon receiving notification from the detection unit, the virtual machine monitor switches to managing the application in the non-writable state and notifies the verification unit of the switch, and upon receiving notification from the virtual machine monitor, the verification unit verifies authorization of the application.

With this structure for the information processing device in the present invention, after the virtual machine monitor switches to managing the application in the work area in a non-writable state, the verification unit determines whether the application is authorized. Switching to managing the application in a non-writable state before the verification unit verifies authorization of the application prevents the application from being replaced in the work area by an unauthorized application after the verification unit determines the application to be authorized.

The information processing device in Claim 1 of the present invention comprises: a virtual machine operable to cause an application, which accesses a predetermined device, to operate in a work area; a detection unit operable to detect, from the virtual machine, an access request to access the predetermined device via the application; a verification unit operable to verify authorization of the application; and a virtual machine monitor operable to manage the virtual machine, the verification unit, and the detection unit and to switch between managing the application in one of a writeable state and a non-writable state, wherein upon detecting the access request, the detection unit notifies the virtual machine monitor of the detection, upon receiving notification from the detection unit, the virtual machine monitor switches to managing the application in the non-writable state and notifies the verification unit of the switch, and upon receiving notification from the virtual machine monitor, the verification unit verifies authorization of the application.

In the present invention, after the virtual machine monitor switches to managing the application in the work area in a non-writable state, the verification unit determines whether the application is authorized. Switching to managing the application in a non-writable state before the verification unit verifies authorization of the application prevents the application from being replaced in the work area by another application after the verification unit determines the application to be authorized.

The information processing device in Claim 2 of the present invention further comprises an execution unit that accesses the predetermined device via the application when the verification unit determines that the application is authorized.

In the present invention, after the virtual machine monitor switches to managing the application in the work area in a non-writable state, the application is determined to be authorized or unauthorized, and a predetermined device is accessed via the application. Switching to managing the application in a non-writable state before the verification unit verifies authorization of the application prevents the application from being replaced in the work area by an unauthorized application and prevents use of the unauthorized application to access the predetermined device after the verification unit determines the application to be authorized.

In the information processing device in Claim 3 of the present invention, after the execution unit finishes accessing the predetermined device via the application, the virtual machine monitor switches back to managing the application in the writable state.

In the present invention, the virtual machine monitor switches back to managing the application in a writable state after the execution unit accesses the predetermined device via the application. Since the application can be removed from the work area after access of the predetermined device via the application, unnecessary use of the workspace by the application after processing is complete can be prevented.

In the information processing device in Claim 4 of the present invention, the virtual machine monitor manages management information corresponding to the application, the management information including privilege information that indicates one or more subjects having authority to rewrite the management information, and when the privilege information indicates that the virtual machine is a subject that can rewrite the application, the virtual machine monitor switches to managing the application in the non-writable state by rewriting the privilege information to exclude the virtual machine from the subjects that can rewrite the application.

In the present invention, the virtual machine monitor rewrites privilege information within management information rewritable by the virtual machine so that the virtual machine cannot rewrite the application. Thus, by rewriting the privilege information, the virtual machine monitor can prevent the virtual machine from rewriting the management information. This prevents the application from being replaced in the work area by another application after the verification unit determines the application to be authorized.

Since the virtual machine monitor rewrites the privilege information, which is part of the management information, to exclude the virtual machine from the subjects that can rewrite the application, it is easy for the virtual machine monitor to prevent the virtual machine from rewriting an application operating in the work area. Furthermore, since existing information, i.e. the privilege information in the management information, is rewritten, another data structure for prohibiting rewriting of the management information by the virtual machine is not necessary, making the structure to prohibit rewriting simple.

In the information processing device in Claim 5 of the present invention, the virtual machine monitor excludes the virtual machine from the subjects that can rewrite the application by rewriting the privilege information, so that instead of including the virtual machine and the virtual machine monitor as the subjects that can rewrite the application, the privilege information limits the subjects that can rewrite the application to the virtual machine monitor.

In the present invention, the virtual machine monitor excludes the virtual machine from the subjects that can rewrite the application by rewriting the privilege information, so that the privilege information does not include the virtual machine as a subject that can rewrite the application. Therefore, it is easy for the virtual machine monitor to prevent the virtual machine from rewriting an application operating in the work area.

In the information processing device in Claim 6 of the present invention, the predetermined device is an SD card.

In the information processing device in Claim 7 of the present invention, the predetermined device is an external content server that provides content to the information processing device.

The information processing device in Claim 8 of the present invention comprises: a virtual machine operable to cause an application, which accesses a predetermined device, to operate in a work area; a detection unit operable to detect, from the virtual machine, an access request to access the predetermined device via the application; and a virtual machine monitor operable to manage the virtual machine and the detection unit and to switch between managing the application in one of a writeable state and a non-writable state, wherein upon detecting the access request, the detection unit notifies the virtual machine monitor of the detection, and upon receiving notification from the detection unit, the virtual machine monitor (i) switches to managing the application in the non-writable state and notifies an external device provided with a verification unit of the switch and (ii) causes the verification unit in the external device to verify authorization of the application.

In the present invention, the verification unit may be included in a device external to the information processing device instead of being included in the information processing device.

The information processing device in Claim 9 of the present invention comprises: a virtual machine operable to cause an application, which accesses a predetermined device, to operate in a work area; a detection unit operable to detect, from the virtual machine, an access request to access the predetermined device via the application; a virtual machine monitor operable to manage the virtual machine and the detection unit and to switch between managing the application in one of a writeable state and a non-writable state; and a transmission unit operable to transmit to an external device that is provided with an execution unit and that provides services, wherein upon detecting the access request, the detection unit notifies the virtual machine monitor of the detection, upon receiving notification from the detection unit, the virtual machine monitor switches to managing the application in the non-writable state, and when the application is determined to be authorized after being switched to management in the non-writable state, the transmission unit receives the services provided by the execution unit in the external device.

In the present invention, the execution unit may be included in a device external to the information processing device instead of being included in the information processing device.

Claim 10 of the present invention is a control method for controlling an information processing device that comprises: a virtual machine operable to cause an application, which accesses a predetermined device, to operate in a work area; a detection unit operable to detect, from the virtual machine, an access request to access the predetermined device via the application; a verification unit operable to verify authorization of the application; and a virtual machine monitor operable to manage the virtual machine, the verification unit, and the detection unit, wherein upon detecting the access request, the detection unit notifies the virtual machine monitor of the detection, upon receiving notification from the detection unit, the virtual machine monitor switches to managing the application in a non-writable state and notifies the verification unit of the switch, and upon receiving notification from the virtual machine monitor, the verification unit verifies authorization of the application.

In the present invention, after the virtual machine monitor switches to managing the application in the work area in a non-writable state, the verification unit determines whether the application is authorized. Switching to managing the application in a non-writable state before the verification unit verifies authorization of the application prevents the application from being replaced in the work area by an unauthorized application after the verification unit determines the application to be authorized.

Claim 11 of the present invention is a control program for controlling an information processing device that comprises: a virtual machine operable to cause an application, which accesses a predetermined device, to operate in a work area; a detection unit operable to detect, from the virtual machine, an access request to access the predetermined device via the application; a verification unit operable to verify authorization of the application; and a virtual machine monitor operable to manage the virtual machine, the verification unit, and the detection unit, the control program comprising the steps of: notifying the virtual machine monitor when the detection unit detects an access request; causing the virtual machine monitor to switch to managing the application in a non-writable state and causing the virtual machine monitor to notify the verification unit of the switch; and causing the verification unit, which receives notification from the virtual machine monitor, to verify authorization of the application.

In the present invention, after the virtual machine monitor switches to managing the application in the work area in a non-writable state, the verification unit determines whether the application is authorized. Switching to managing the application in a non-writable state before the verification unit verifies authorization of the application prevents the application from being replaced in the work area by an unauthorized application after the verification unit determines the application to be authorized.

The integrated circuit used in an information processing device in Claim 12 of the present invention comprises: a virtual machine operable to cause an application, which accesses a predetermined device, to operate in a work area; a detection unit operable to detect, from the virtual machine, an access request to access the predetermined device via the application; a verification unit operable to verify authorization of the application; and a virtual machine monitor operable to manage the virtual machine, the verification unit, and the detection unit, wherein upon detecting the access request, the detection unit notifies the virtual machine monitor of the detection, upon receiving notification from the detection unit, the virtual machine monitor switches to managing the application in a non-writable state and notifies the verification unit of the switch, and upon receiving notification from the virtual machine monitor, the verification unit verifies authorization of the application.

In the present invention, after the virtual machine monitor switches to managing the application in the work area in a non-writable state, the verification unit determines whether the application is authorized. Switching to managing the application in a non-writable state before the verification unit verifies authorization of the application prevents the application from being replaced in the work area by an unauthorized application after the verification unit determines the application to be authorized.

BRIEF DESCRIPTION OF DRAWINGS

FIG. 5 shows an example of a data structure of a page table in embodiment 1 of the present invention.

FIG. 6 shows access control when a CPU in embodiment 1 of the present invention accesses normal memory and protected memory.

FIG. 23 shows an example of a rewritten data structure of a page table in embodiment 1 of the present invention.

Figure 1:
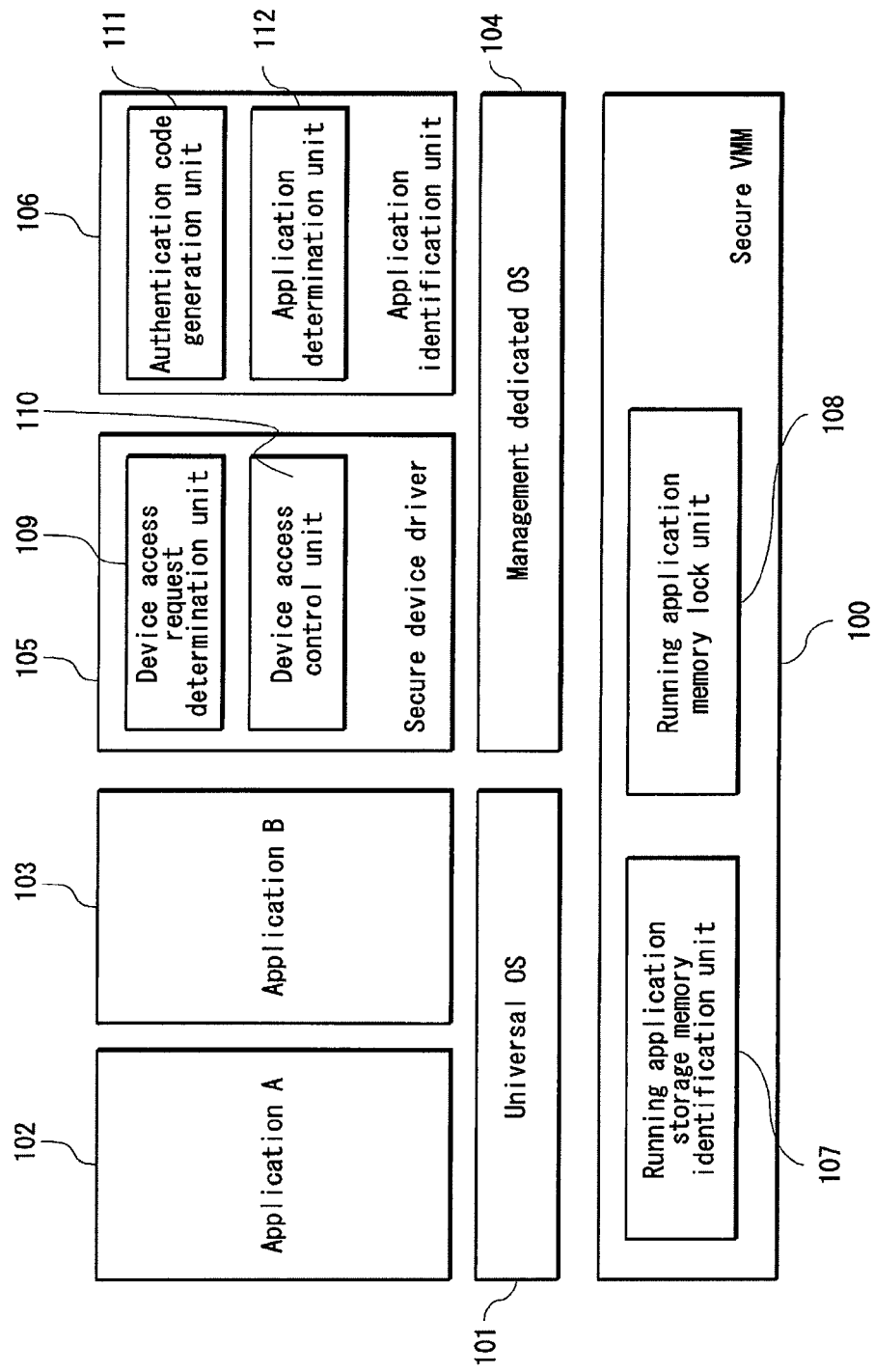
FIG. 1 is a block diagram showing a software configuration in embodiment 1 of the present invention.

REFERENCE SIGNS LIST 100, 133, 190, 200, 230, 260, 280 secure VMM
101, 129, 180, 201, 231, 261, 281, 401 universal OS
102, 103, 127, 128, 183, 184, 202, 203, 232, 233, 262, 263, 282, 283 application
104, 132, 204, 234, 264, 284 management dedicated OS
105, 130, 205, 265, 285 secure device driver
106, 131, 206, 236, 266, 286 application identification unit
107, 207, 237, 267, 287 running application storage memory identification unit
108, 208, 238, 268, 288 running application memory lock unit
109, 209, 239, 269, 290 device access request determination unit
110, 210, 270, 291 device access control unit
111, 211, 240, 271, 289 authentication code generation unit
112, 223, 254, 272, 292 application determination unit
120, 220, 250 information processing device
121 CPU
122 MMU
123, 141, 151 normal memory
124, 143 protected memory
125 bus
126 secure device
134 non-volatile storage device
140 physical memory space in information processing device
142, 144, 152 reserved area
150 virtual physical memory space allotted to universal OS by secure VMM
135, 136, 153, 160, 181, 182, 300 page table
154 logical memory space of application
161, 301 page number field
162, 302 logical address number field
163, 303 virtual physical address number field
164, 304 privilege information field
165, 305 writable/non-writable information field
166, 306 readable/non-readable information field
167, 307 other information field
170 field showing access control when normal memory or protected memory are accessed
191 current page table managed by universal OS
192 current page table managed by management dedicated OS
193 universal OS and application currently operating
194 management dedicated OS and application currently operating on management dedicated OS
212, 241 transmission unit
221, 251 application determination server
222, 253 network
235 network interface driver
252 service provider server
255 service provider unit
256 service provider determination unit
400 VMM
402 network compatible application
403 universal OS NIC proxy
404 real-time OS
405 real-time NIC proxy
406 real-time UDP/IP
407 NIC driver

DETAILED DESCRIPTION OF INVENTION

Embodiments of the present invention are described below with reference to the drawings.

Embodiment 1

Description of Software Configuration in Embodiment 1

FIG. 1 is a diagram showing the software configuration in embodiment 1 of the present invention.

An information processing device in embodiment 1 is composed of the following: a secure VMM 100, which is a virtual machine monitor; a universal OS 101; an application A 102; an application B 103; a management dedicated OS 104; a secure device driver 105, which includes a device access request determination unit 109, which is a detection unit, and a secure access control unit 110, which is an execution unit; and an application identification unit 106, which is a verification unit. The virtual machine includes the universal OS 101, application A 102, and application B 103.

The secure VMM 100 provides an OS virtualization function. The universal OS 101 and management dedicated OS 104 are an operating system that operate on the virtualized hardware provided by the secure VMM 100.

The secure VMM 100 is provided with a running application storage memory identification unit 107 and a running application memory lock unit 108.

Application A 102 and application B 103 are applications that provide services to a user and that access a secure device, not shown in FIG. 1, as necessary.

The secure device driver 105 is a device driver to control a secure device, not shown in FIG. 1, and is provided with the device access request determination unit 109 and the secure access control unit 110.

The application identification unit 106 is provided with an authentication code generation unit 111 and an application determination unit 112.

Description of the Constituent Elements of the Secure VMM

The running application storage memory identification unit 107 specifies an application on the universal OS 101 that accesses a secure device not shown in FIG. 1. Details are provided below.

The running application memory lock unit 108 controls a page table corresponding to an application on the universal OS 101 that accesses a secure device not shown in FIG. 1. Details are provided below.

Description of the Constituent Elements of the Secure Device Driver

The device access request determination unit 109 detects a request to access a secure device, not shown in FIG. 1. Details are provided below.

The secure access control unit 110 controls access to a secure device, not shown in FIG. 1. Details are provided below.

Description of the Constituent Elements of the Application Identification Unit The authentication code generation unit ill generates an authentication code of an application on the universal OS 101 for a secure device, not shown in FIG. 1. Details are provided below.

The application determination unit 112 uses the authentication code of the application to determine whether the application is authorized. Details are provided below.

Description of the Hardware Configuration in Embodiment 1

Figure 2:
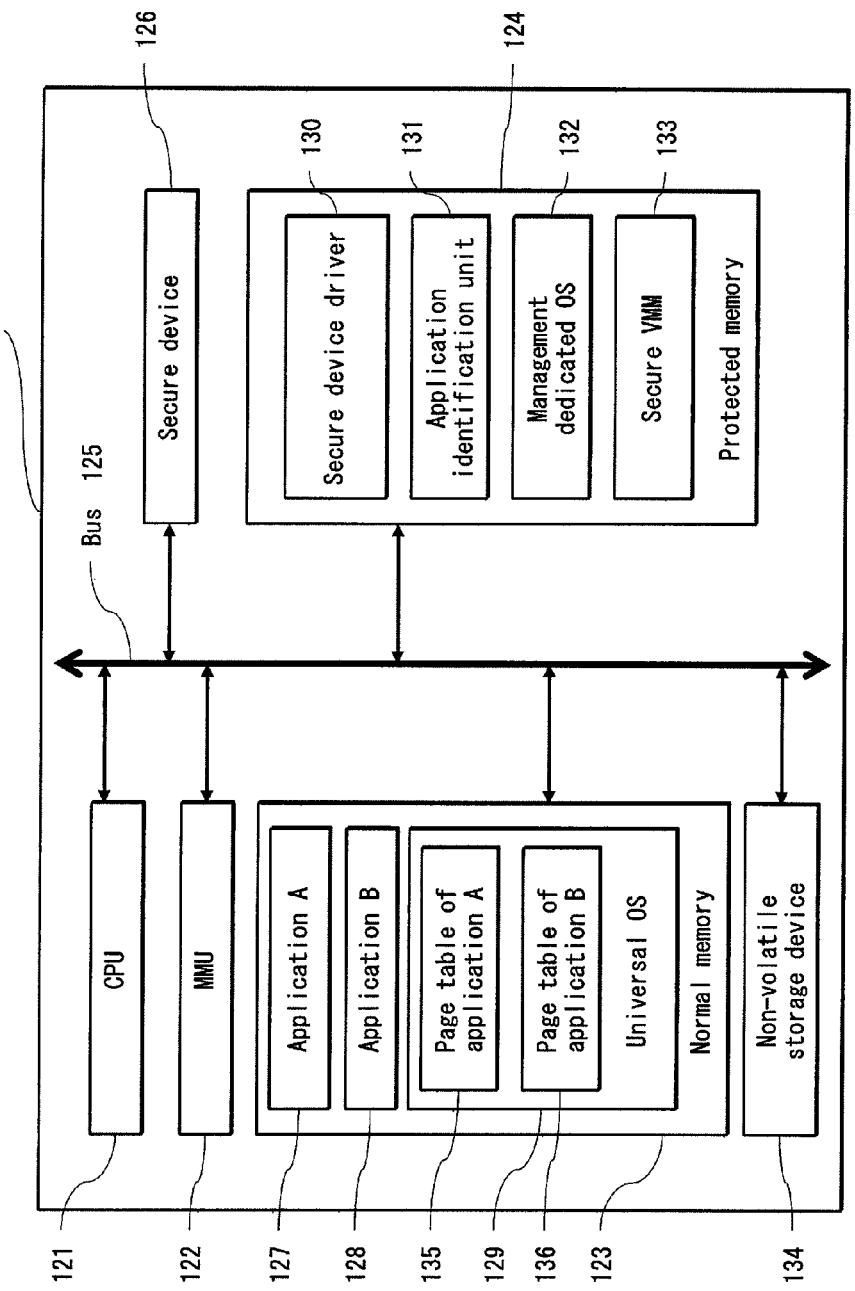
FIG. 2 is a block diagram showing a software configuration in embodiment 1 of the present invention.

FIG. 2 is a hardware configuration diagram for the information processing device 120 on which the software in FIG. 1 operates.

In the information processing device 120 in FIG. 2, a CPU 121, a Memory Management Unit (MMU) 122, a normal memory 123, a protected memory 124, a secure device 126, and a non-volatile storage device 134 are connected to each other via a bus 125.

The information processing device 120 is further provided with an I/O unit, auxiliary storage device, etc. which are not shown in FIG. 2, but since these elements do not pertain to the essence of the present invention, a description thereof is omitted.

The following is a detailed description of each constituent element in the information processing device 120.

Description of the Constituent Elements in the Hardware of the Information Processing Device The CPU 121 controls the overall operations of the information processing device 120 by executing command code included in programs and the like stored in the normal memory 123 and the protected memory 124.

The MMU 122 refers to a page table, not shown in FIG. 2, and provides the CPU 121 with a function to convert a physical address number into a logical address (also generally referred to as "virtual address") number. Furthermore, the MMU 122 refers to a page table, not shown in FIG. 2, and in accordance with the privilege status of the CPU 121, provides a function to control access to write to the memory, read the memory, etc.

The non-volatile storage device 134 is a non-volatile storage device storing an application A 127 and an application B 128. Specifically, the non-volatile storage device 134 is a hard disk, flash memory, etc.

The normal memory 123 is a volatile storage device that loads and executes application A 127 and application B 128, stored in the non-volatile storage device 134, and a universal OS 129. The normal memory 123 corresponds to the work area in the present invention.

The protected memory 124 is a storage device storing the secure device driver 130, application identification unit 131, management dedicated OS 132, and secure VMM 133.

The secure device 126 is a device that handles information to be protected, such as content. Access to the secure device 126 by unauthorized applications needs to be prevented. The secure device 126 is, for example, a decryption circuit that decrypts encrypted content. Other possible examples include a recording medium, such as flash memory, on which encrypted content is recorded, or memory storing decrypted content. The secure device is not limited to being internal to the information processing device, but may also be an external recording device such as an SD card.

Furthermore, the protected memory 124 and the secure device 126 are controlled so as to be accessible only by software stored in the protected memory 124.

Description of Relationship Between Universal OS and Application

The universal OS 129 stores a page table 135 and a page table 136 respectively for an application A 127 and an application B 128 operating on the universal OS 129. Details on the page table are provided below.

Description of Memory Space Using OS Virtualization Function

Figure 3:
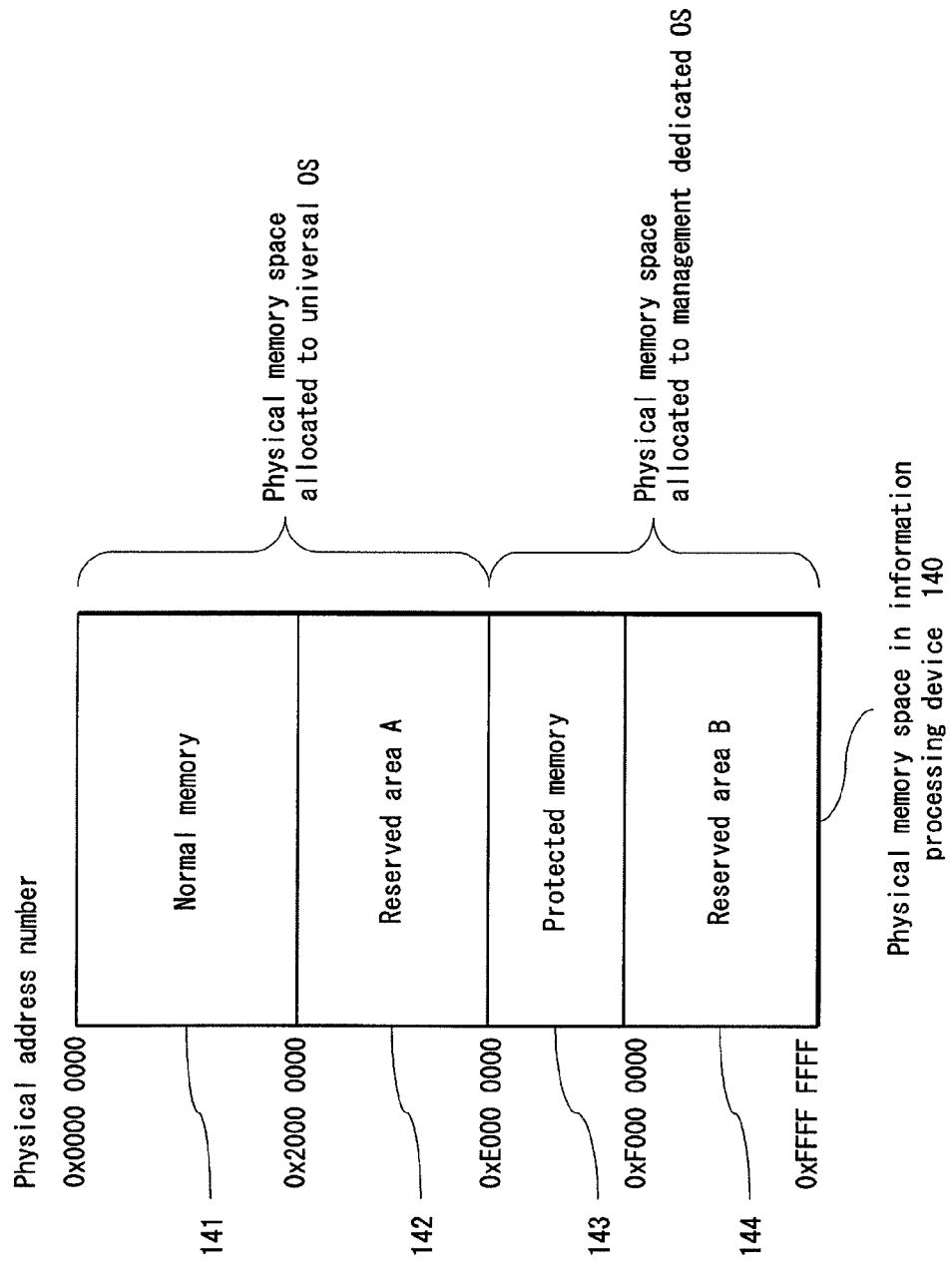
FIG. 3 shows physical memory space in an information processing device in embodiment 1 of the present invention.

FIG. 3 shows a physical memory space 140 in the information processing device 120.

The physical memory space 140 in the information processing device 120 is composed of a memory space 141 corresponding to the normal memory, a reserved area A142, a memory space 143 corresponding to the protected memory, and a reserved area B144. The physical memory space 140 in the information processing device can be uniquely specified by a physical memory address.

The secure VMM 100 manages the physical memory space 140 of the information processing device by dividing it into a physical memory space allocated to the universal OS 101 and a physical memory space allocated to the management dedicated OS 104.

The physical memory space allocated to the universal OS 101 is composed of a memory space 141 corresponding to the normal memory and a reserved area A142.

The physical memory space allocated to the management dedicated OS 104 is composed of a memory space 143 corresponding to the protected memory and a reserved area B144.

The secure VMM 100 causes the universal OS 101 and the management dedicated OS 104 to refer to their respective memory spaces as virtual physical address spaces. The universal OS 101 and the management dedicated OS 104 read from and write to their respective virtual physical address spaces using virtual physical address numbers.

Figure 4:
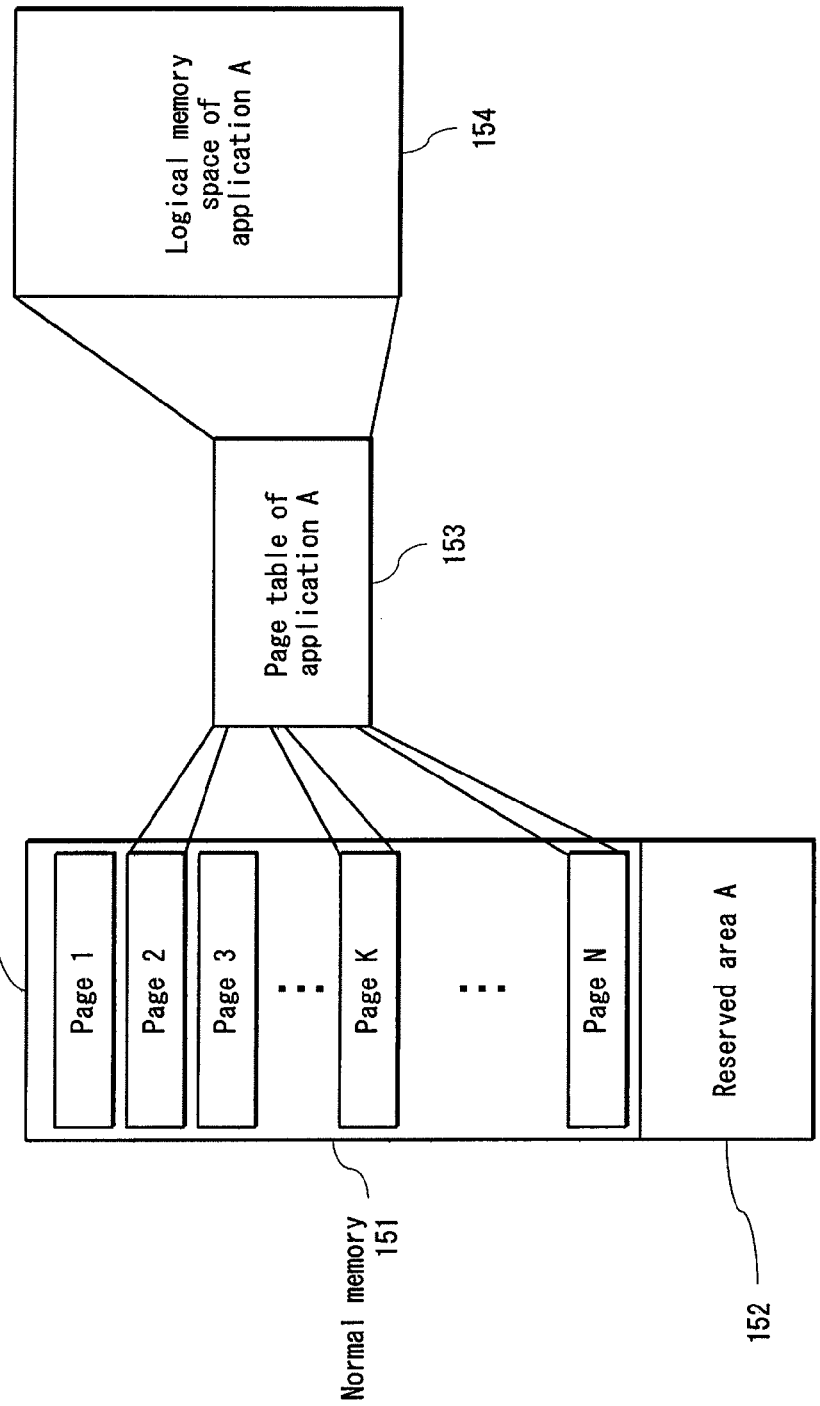
FIG. 4 shows an example of a relationship between virtual physical memory space and logical memory space in embodiment 1 of the present invention.

Description of the Virtual Physical Memory Space and the Logical Memory Space FIG. 4 shows an example of the relationship between virtual physical memory space and logical memory (also generally referred to as "virtual memory") space. Note that the universal OS reads from and writes to the virtual physical memory space shown in FIG. 4.

The normal memory 151 is managed by being divided into sizes of a fixed length, called pages.

The page table 153 manages a group of multiple pages to form a logical address space. Furthermore, one page table corresponds to one application.

An application reads from and writes to logical address spaces using logical address numbers.

Description of Constituent Elements of Page Table

FIG. 5 shows an example of the data structure of a page table 160.

Each entry in the page table 160, corresponding to a page, has a data structure composed of a page number 161, logical address number 162, virtual physical address number 163, privilege information 164, writable/non-writable information 165, readable/non-readable information 166, and other information 167.

The page number 161 is a field storing the number of a page.

The logical address number 162 is a field storing a logical address number corresponding to when the MMU 122 converts a virtual physical address number into a logical address number. This field may store a logical address number corresponding to each virtual physical address number, or may store the top logical address number of the page.

The logical address number 163 is a field storing a virtual physical address number corresponding to when the MMU 122 converts a virtual physical address number into a logical address number. This field may store the top virtual physical address number of the page.

The privilege information 164 is a field storing privilege information to which the MMU 122 refers when controlling access to the memory. Details are provided below.

The writable/non-writable information 165 is a field showing whether the application corresponding to the page table 160 is allowed to write to the page. This field stores information indicating permission or lack of permission.

The readable/non-readable information 166 is a field showing whether the application corresponding to the page table 160 is allowed to read from the page. This field stores information indicating permission or lack of permission.

The other information 167 is a field storing page size, dirty information for a page, or information on attributes other than those listed above.

Changes to the information in each field in the page table are only possible when the privileged mode of the CPU 121 is Ring 0. Note that details on the privileged mode are provided below.

Note that the page table 160 shown in FIG. 5 is a logical data structure, and for example, a widely-known hierarchical page table structure may be used.

Note also that in the page table 160 shown in FIG. 5, privilege information is allocated to each page, but one piece of privilege information may also be allocated for one page table. In that case, the one piece of privilege information may be managed with a separate data structure or register.

In the page table 160 shown in FIG. 5, the writable/non-writable information 165 is a field showing whether writing by an application is permitted, but this field is not limited in this way. For example, this field may indicate both information designating a subject of a write operation stored in the other information 167 and whether the subject is permitted to perform the write operation.

In the page table 160 shown in FIG. 5, the readable/non-readable information 166 is a field showing whether reading by an application is permitted, but this field is not limited in this way. For example, this field may indicate both information designating a subject of a read operation stored in the other information 167 and whether the subject is permitted to perform the read operation.

Description of Controlling Access to Memory Based on Privileged Mode of CPU

FIG. 6 is a table showing access control when the CPU 121 accesses normal memory 123 and protected memory 124.

Either the CPU 121 or the MMU 122 may perform the access control in FIG. 6.

The CPU 121 has privileged modes of Ring 0, Ring 1, Ring 2, and Ring 3. The CPU 121 transitions between privileged modes by executing a privilege command.

Software that operates on a CPU 121 having a privileged mode of Ring 0 can access pages whose privilege information 164 in the page table 160 is Ring 0, Ring 1, Ring 2, and Ring 3. The software can also rewrite page tables whose privilege information 164 field is Ring 0, Ring 1, Ring 2, and Ring 3.

Software that operates on a CPU 121 having a privileged mode of Ring 1 can access pages whose privilege information 164 in the page table 160 is Ring 1, Ring 2, and Ring 3. The software can also rewrite page tables whose privilege information 164 field is Ring 1, Ring 2, and Ring 3. When software that operates on the CPU 121 having a privileged mode of Ring 1 attempts to access a page whose privilege information 164 in the page table 160 indicates Ring 0, the CPU 121 or the MMU 122 detects and denies the unauthorized access.

Software that operates on a CPU 121 having a privileged mode of Ring 2 can access pages whose privilege information 164 in the page table 160 is Ring 2 and Ring 3. The software can also rewrite page tables whose privilege information 164 field is Ring 2 and Ring 3. When software that operates on the CPU 121 having a privilege information of Ring 2 attempts to access a page whose privilege information 164 in the page table 160 indicates Ring 0 or Ring 1, the CPU 121 or the MMU 122 detects and denies the unauthorized access.

Software that operates on a CPU 121 having a privileged mode of Ring 3 can access pages whose privilege information 164 in the page table 160 is Ring 3. The software can also rewrite page tables whose privilege information 164 field is Ring 3. When software that operates on the CPU 121 having a privileged mode of Ring 3 attempts to access a page whose privilege information 164 in the page table 160 indicates Ring 0, Ring 1, or Ring 2, the CPU 121 or the MMU 122 detects and denies the unauthorized access.

In the information processing device 120, the secure VMM 100 is allocated to Ring 0, the management dedicated OS 104 to Ring 1, the universal OS 101 to Ring 2, and applications operating on the universal OS to Ring 3.

Note, however, that the allocation of privileges to Rings is not limited in this way. Other allocation methods may be used, as long as the privileges allocated to the universal OS 101 and to the applications operating on the universal OS are lower than the privileges allocated to the secure VMM 100 and to the management dedicated OS 104.

Description of Processing to Load Applications

Figure 22:
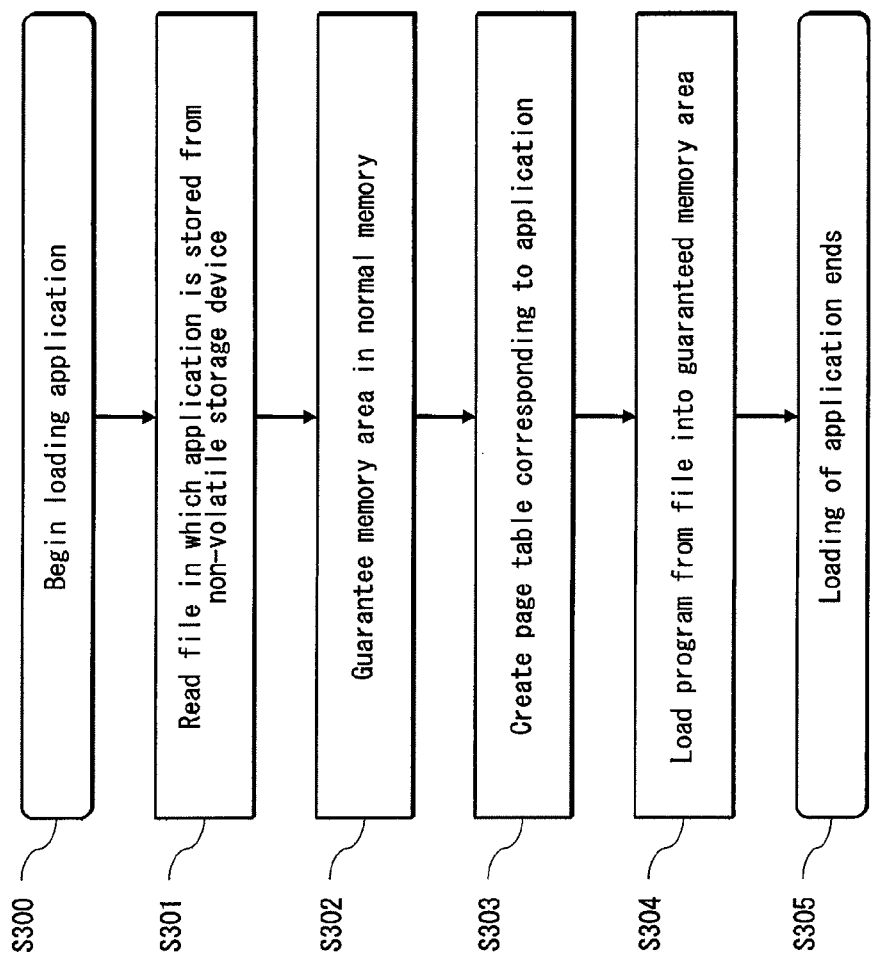
FIG. 22 is a sequence diagram showing loading of an application on a universal OS.

FIG. 22 is a sequence diagram showing loading of an application by a universal OS.

Loading of an application begins after indication by a user, for example, via an interface not shown in FIG. 22 (S300).

The universal OS 180 reads the file storing the application from the non-volatile storage device 134 (S301).

The universal OS 180 refers to the required memory size stored in the header of the file, calculates the memory size to allocate to the application, and guarantees the required memory area from the normal memory 123 (S302).

The universal OS 180 internally creates a page table corresponding to the application (S303).

The universal OS 180 loads the application program (code and data) from the file read in step S301 into the memory area guaranteed in step S302 (S304).

The universal OS 180 then terminates processing to load the application (S305).

Note that steps S304 and S305 may be performed in reverse order.

Description of Operations on Page Tables and Applications by OS

Figure 7:
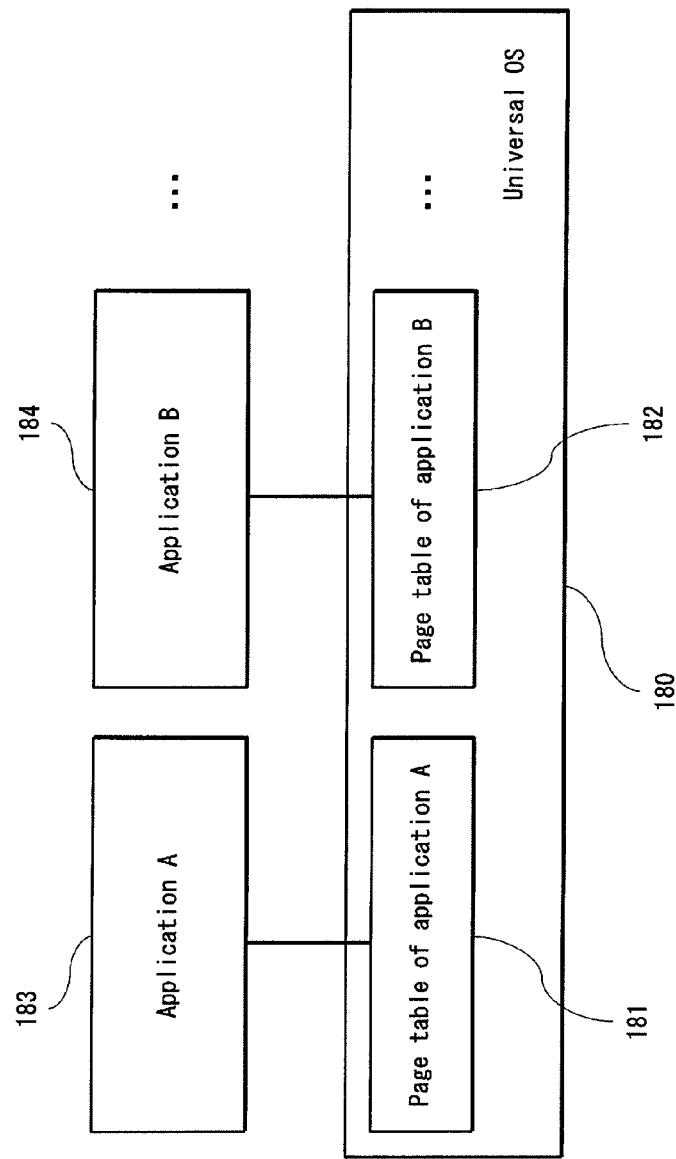
FIG. 7 shows an example of operations on page tables and applications by a universal OS in embodiment 1 of the present invention.

FIG. 7 shows an example of operations on page tables and applications by the universal OS. In FIG. 7, application A 183 and application B 184 operate on the universal OS 180.

The universal OS 180 allocates the CPU to application A 183 and application B 184 via time-sharing to cause the application A 183 and application B 184 to operate.

During the allocation via time-sharing, the universal OS 180 switches between the application A 183 and the application B 184. The universal OS 180 accomplishes this switching by switching between the page table corresponding to each application.

In the case in FIG. 7, the universal OS 180 retains the page table 181 corresponding to application A 183 and the page table 182 corresponding to application B 184 and executes the applications via time-sharing by switching between these page tables.

Also, the management dedicated OS 104 switches between software operating on the management dedicated OS 104 by performing similar operations on page tables.

Figure 8:
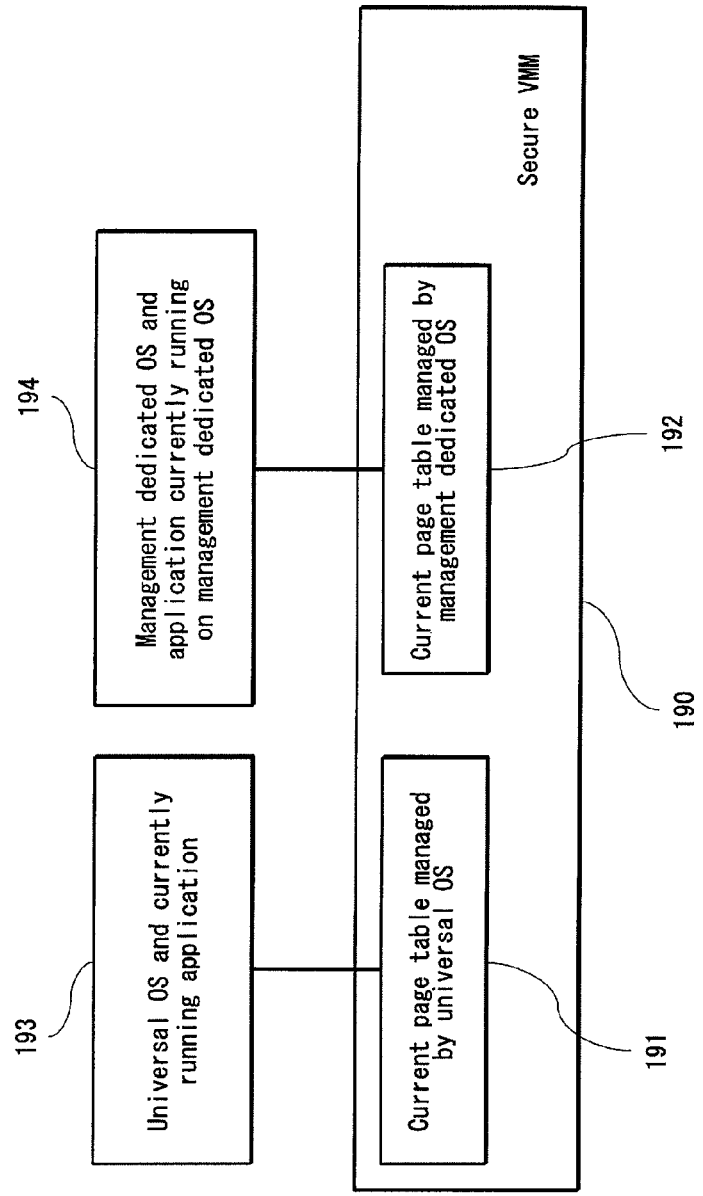
FIG. 8 shows an example of operations on page tables and software execution environments by a secure VMM in embodiment 1 of the present invention.

Description of Operations on Page Tables and Software Execution Environments by the Secure VMM FIG. 8 shows an example of operations on page tables and software execution environments by the secure VMM. In FIG. 8, the universal OS 193 and management dedicated OS 194 operate on the secure VMM 190.

The secure VMM 190 allocates the CPU to the universal OS 193 and the management dedicated OS 194 via time-sharing to cause the universal OS 193 and the management dedicated OS 194 to operate.

During the allocation via time-sharing, the secure VMM 190 switches between the universal OS 193 and the management dedicated OS 194. The secure VMM 190 accomplishes this switching by switching between the current page table corresponding to each OS (software execution environment). The current page table is the page table to which each OS causes the CPU 121 to refer.

In the case in FIG. 8, the secure VMM 190 retains the current page table 191 corresponding to the universal OS 193 and the current page table 192 corresponding to the management dedicated OS 194 and executes each OS (software execution environment) via time-sharing by switching between these page tables.

Figure 9:
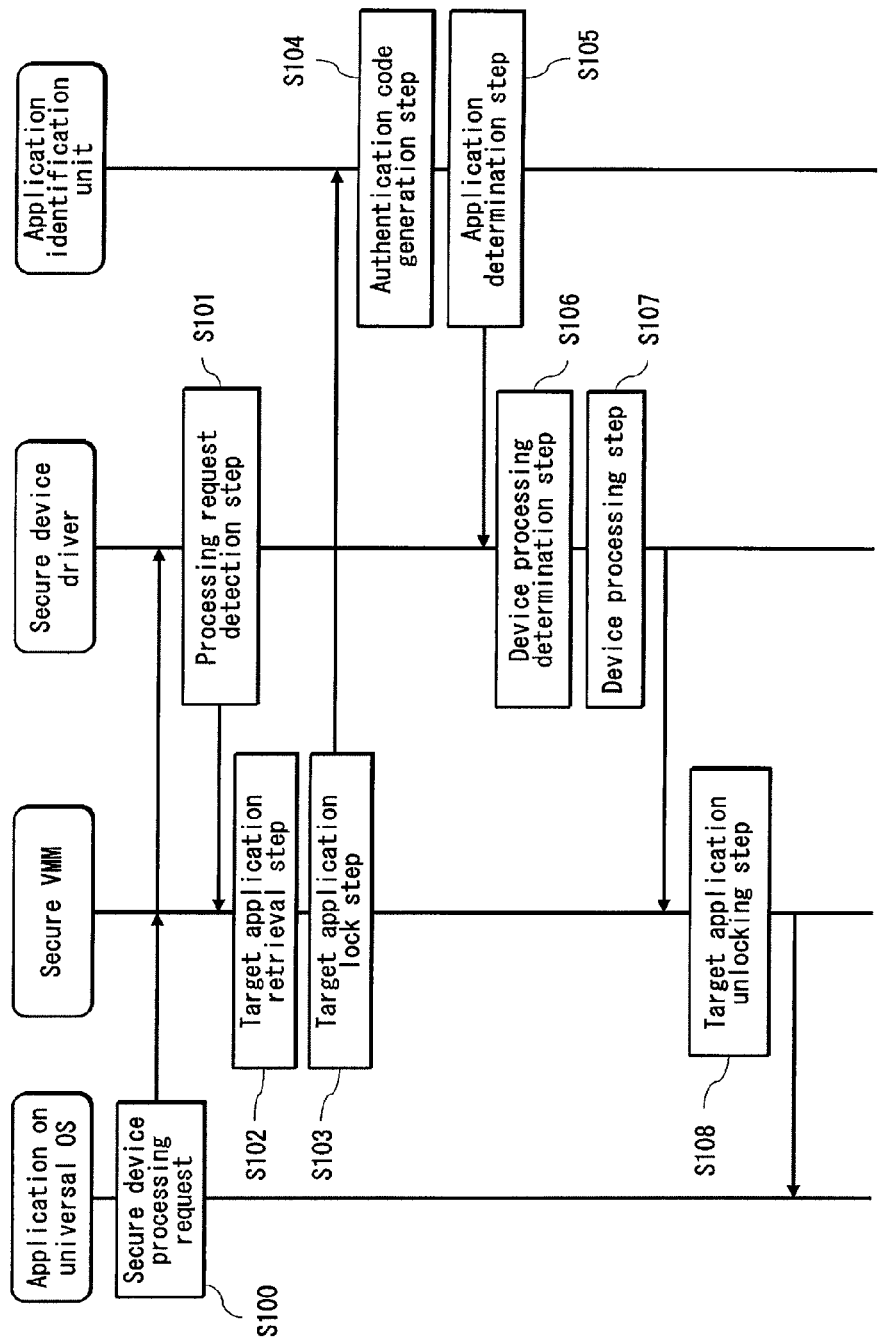
FIG. 9 is a sequence diagram showing prevention of secure device access by an unauthorized application in embodiment 1 of the present invention.

Description of Detecting Access to a Secure Device by an Unauthorized Application and Prevention of Access With reference to FIG. 9, the following is a description of how the information processing device 120 detects access to a secure device by an unauthorized application and prevents access.

An application on the universal OS 101 issues a secure device processing request via the universal OS 101 (S100).

The secure VMM 100 switches from the universal OS 101 to the management dedicated OS 104 via the above-described operations on the software execution environment. During the processing request detection step, the device access request determination unit 109 in the secure device driver 105 detects the secure device processing request. The device access request determination unit 109 issues a target application retrieval request to the secure VMM 100 (S101).

In response to the target application retrieval request, the secure VMM 100 performs a target application retrieval step and a target application lock step.

During the target application retrieval step, the running application storage memory identification unit 107 in the secure VMM 100 retrieves the current page table of the universal OS 101. Since the application causing the universal OS 101 to operate is the application that issued the secure device processing request, the current page table is the page table for this application (S102).

During the target application lock step, the running application memory lock unit 108 in the secure VMM 100 backs up the information stored in the current page table of the universal OS 101 in the protected memory. The running application memory lock unit 108 then changes all of the writable/non-writable information fields in the current page table of the universal OS 101 to "non-writable". For example, performing the above operations changes the page table 160 shown in FIG. 5 to the page table 300 shown in FIG. 23. In the rewritten page table 300, the field for the privilege information 164 in the page table 160, which was Ring 3 before rewriting, is rewritten to Ring 0, as shown by the privilege information 304 in the page table 300. Furthermore, in the rewritten page table 300, the fields for writable/non-writable information 165 in the page table 160 are all rewritten to "non-writable" as shown by the writable/non-writable information 305 in the page table 300.

It thus becomes impossible to rewrite the memory space into which the application that issues a secure device processing request has been loaded. Furthermore, the privilege information field is changed to a Ring number that ensures that the privilege information field cannot be changed under the privileges allocated to the universal OS and the applications operating on the universal OS. By changing the privilege information, it becomes impossible for the universal OS and the application operating on the universal OS to restore the field for the writable/non-writable information from "non-writable" to "writable" regardless of the original privilege information of the current page table. This makes it possible to prevent an attack whereby the universal OS or an application operating on the universal OS restores the writable/non-writable information field in the page table to "writable", making it possible to rewrite the memory space into which an application is loaded. In the present embodiment, by rewriting the writable/non-writable information 165 field and the privilege information field, a virtual machine that includes the universal OS and all of the applications operating on the universal OS is prevented from being able to rewrite an application that issues a secure device processing request. An application identification request is issued to the application identification unit 106 (S103).

In response to the application identification request, the application identification unit 106 performs a authentication code generation step and an application determination step.

During the authentication code generation step, the authentication code generation unit 111 of the application identification unit 106 uses the retrieved page table to refer to the logical address space. The authentication code generation unit 111 uses a one-way function such as SHA1 to generate a hash value from the program stored in the referenced logical address space (S104).

Next, during the application determination step, the application determination unit 112 of the application identification unit 106 determines whether the generated hash value matches a pre-stored reference hash value. If the values match, the application determination unit 112 determines that the application that issued the secure device processing request in S100 is an authorized application. If the values do not match, the application determination unit 112 determines that the application that issued the secure device processing request in S100 is an unauthorized application. The application determination unit 112 refers to the determination results and issues a device access control request to the secure device driver 105 (S105).

In response to the device access control request, the device access control unit 110 in the secure device driver 105 permits access to the secure device when the determination results indicate that the application is authorized. When the determination results indicate that the application is unauthorized, the device access control unit 110 denies access to the secure device (S106).

When the device access control unit 110 permits access to the secure device, the secure device driver 105 performs processing on the secure device (S107). After processing is complete, the secure device driver 105 issues a target application unlocking request to the secure VMM 100.

In response to the target application unlocking request, the running application memory lock unit 108 of the secure VMM 100 performs a target application unlocking step.

During the target application unlocking step, the running application memory lock unit 108 resets the current page table of the universal OS 101 to the current page table that was backed up. The writable/non-writable information and the privilege information of the page table thus return to their states before the target application lock step (S108).

The secure VMM 100 then switches to the universal OS 101. The universal OS 101 notifies the application of the processing results of the secure device driver 105.

During step S106, when access to the secure device is determined to be denied, the secure device driver 105 issues a target application unlocking request to the secure VMM 100, and the running application memory lock unit 108 in the secure VMM 100 performs the same processing as in step S108. The secure VMM 100 then switches to the universal OS 101. The universal OS notifies the application of the processing results of the secure device driver 105.

Advantageous Effects of Embodiment 1

In embodiment 1, when a secure device processing request is detected, the application issuing the request is verified after changing the settings of the page table for the application to be non-writable. The settings are kept as non-writable until access to the secure device is complete. This makes it possible to prevent an attack that attempts unauthorized access to the secure device by rewriting an unauthorized application over an application in memory after the application has been verified as being authorized. In other words, since an application is verified after the memory in which the application is loaded is set to be non-writable, it is impossible to replace the application in memory with an unauthorized application immediately after verification is complete.

Furthermore, changing the privilege information field of the page table to a privilege such that the privilege information field cannot be changed by the universal OS or applications operating on the universal OS prevents the universal OS and the applications from being able to restore the settings of the page table to "writable". This prevents an attack whereby an unauthorized application operating on the universal OS restores the settings of the page table to "writable" and replaces an application.

Embodiment 2

Figure 10:
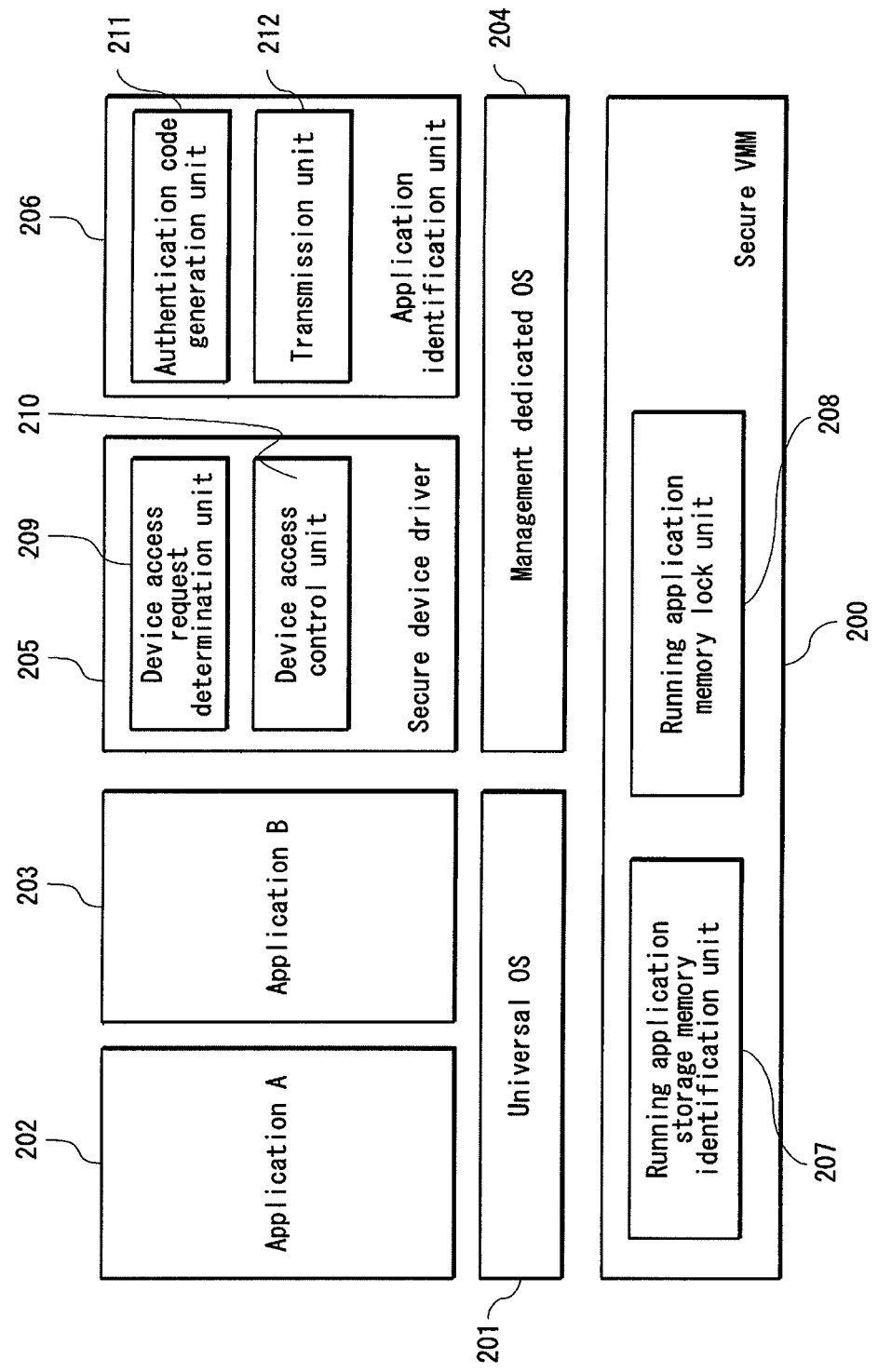
FIG. 10 shows a software configuration in embodiment 2 of the present invention.

FIG. 10 is a diagram showing a software configuration of an information processing device according to embodiment 2 of the present invention.

Figure 11:
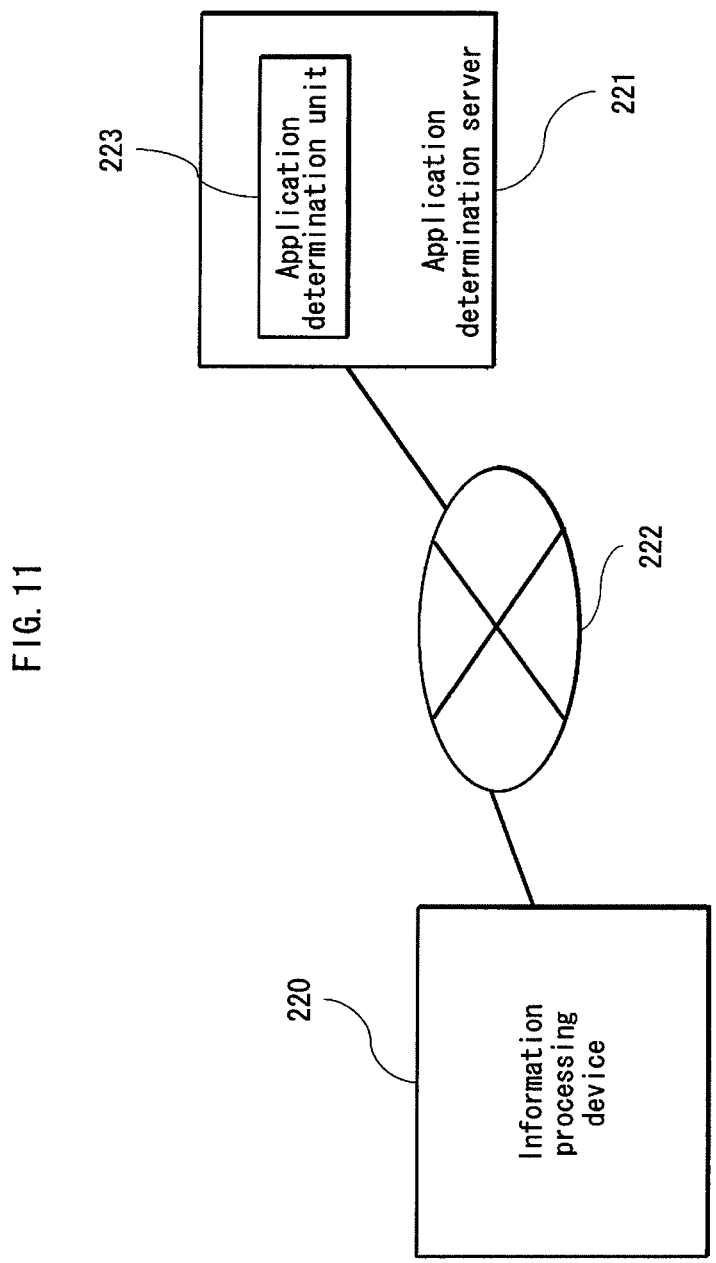
FIG. 11 shows a structure in which an information processing device and an application determination server in embodiment 2 of the present invention are connected via a network.

FIG. 11 shows a structure in which the information processing device and the application determination unit in embodiment 2 of the present invention are connected via a network.

The differences in configuration between the information processing device 120 in embodiment 1 and the information processing device 220 in embodiment 2 are as follows.

In the information processing device 120 in embodiment 1, the application identification unit 106 includes an application determination unit 112 that is a verification unit, whereas the application identification unit 206 in the information processing device 220 in embodiment 2 does not include an application determination unit that is a verification unit. Furthermore, the application identification unit 206 in embodiment 2 differs by including a transmission unit 212.

Furthermore, the information processing device 220 in embodiment 2 is connected to an application determination server 221 via a network 222. The application determination server 221 is provided with an application determination unit 223 that is a verification unit.

The difference in the operations of embodiment 1 and embodiment 2 are as follows.

In embodiment 1, the application determination unit 112 compares the hash value (authentication code) generated by the authentication code generation unit 111 with a reference hash value (authentication code) to make a determination.

In embodiment 2, on the other hand, the transmission unit 212 uses a network function not shown in the figures to transmit a hash value (authentication code) generated by the authentication code generation unit 211 via a network 222 to the application determination server 221. The application determination unit 223 in the application determination server 221 compares the transmitted hash value (authentication code) with a pre-stored hash value (authentication code) to determine whether an application is authorized.

Apart from the above differences, embodiment 2 is the same as embodiment 1, and therefore further description is omitted.

In embodiment 2, the application determination server determines whether an application is authorized. Accordingly, unlike in embodiment 1, there is no need for the information processing device 220 to pre-store a hash value (authentication code) for use in the application determination step. This has the advantageous effect of making it possible to reduce the size of the storage area in the information processing device 220.

Embodiment 3

Figure 12:
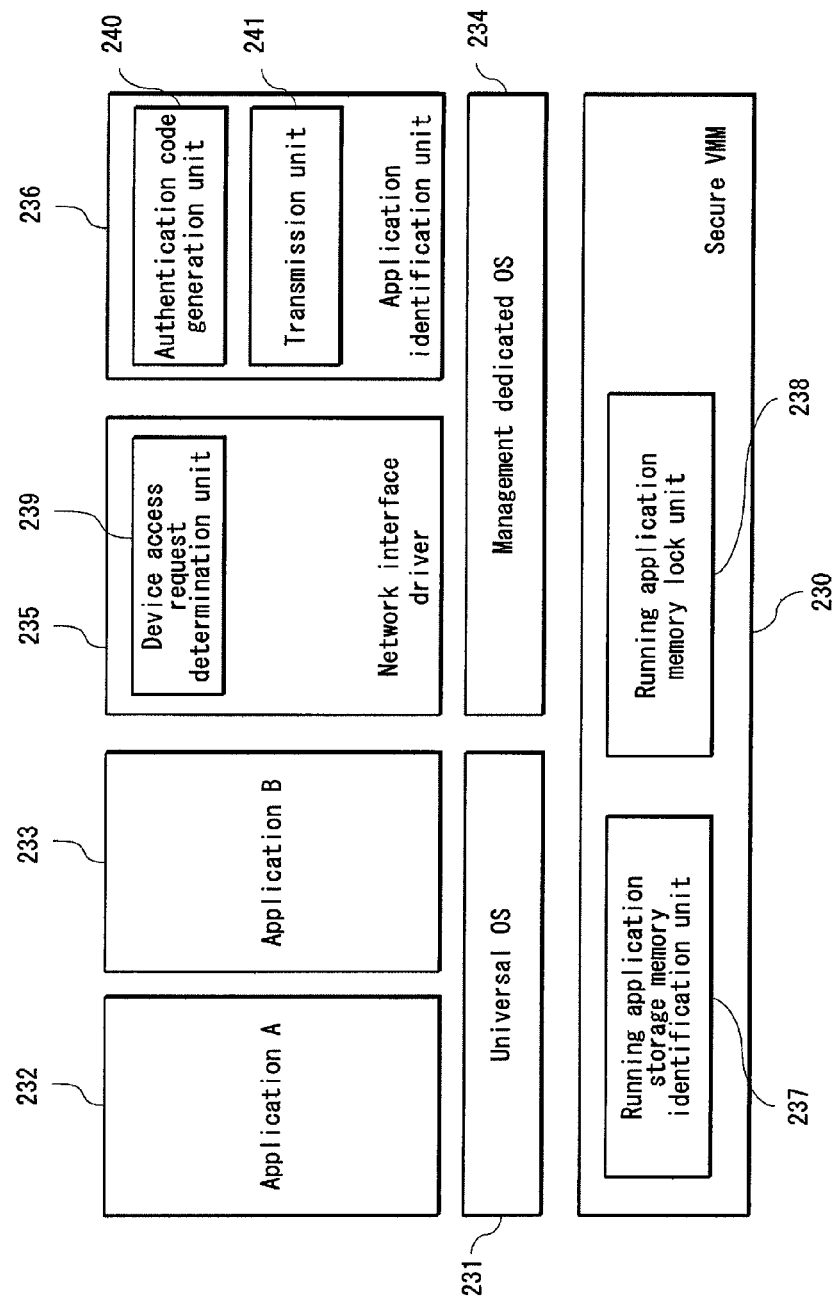
FIG. 12 shows a software configuration in embodiment 3 of the present invention.

FIG. 12 is a block diagram showing a software configuration of an information processing device according to embodiment 3 of the present invention.

Figure 13:
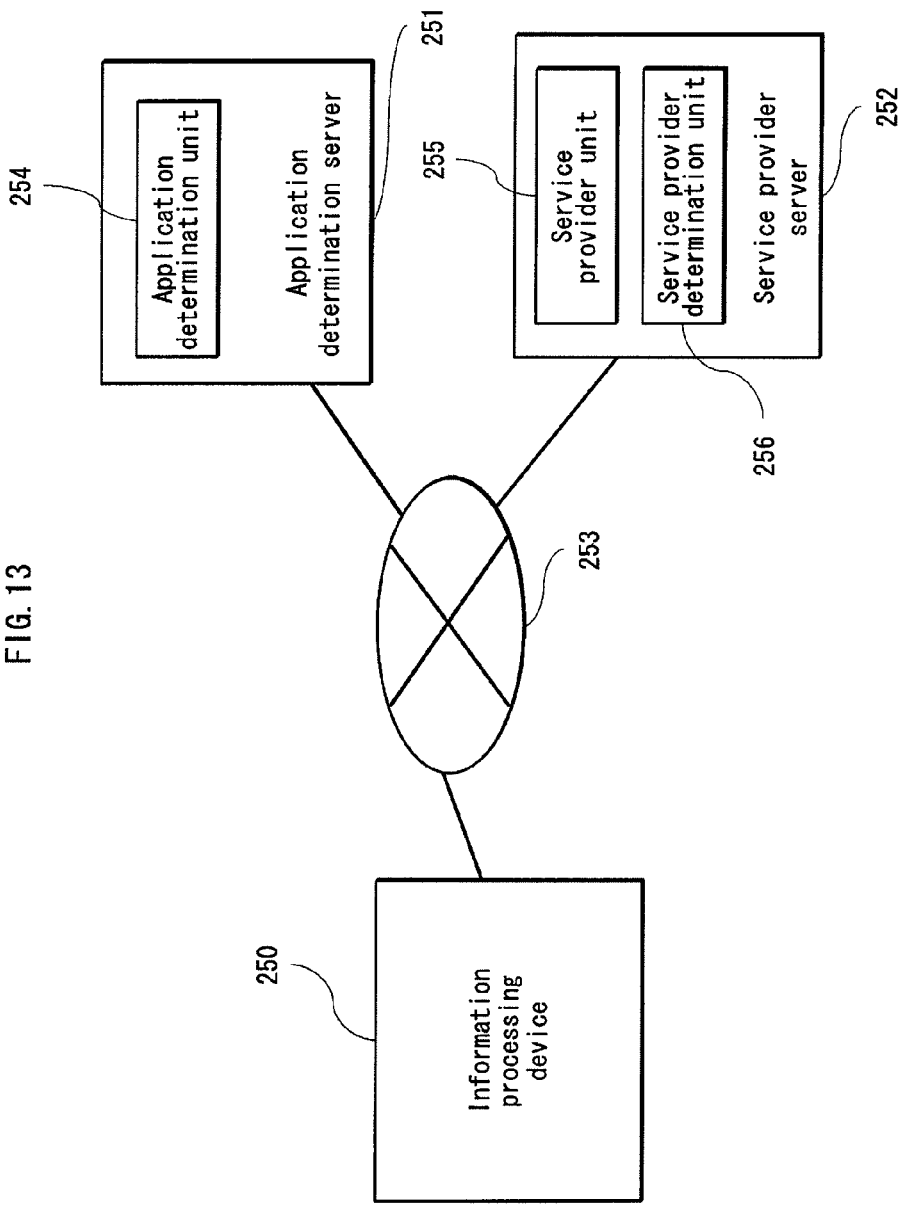
FIG. 13 shows a structure in which an information processing device, an application determination server, and a service provider server in embodiment 3 of the present invention are connected via a network.

FIG. 13 shows a structure in which the information processing device, the application determination unit, and the service provider server in embodiment 3 of the present invention are connected via a network.

Figure 14:
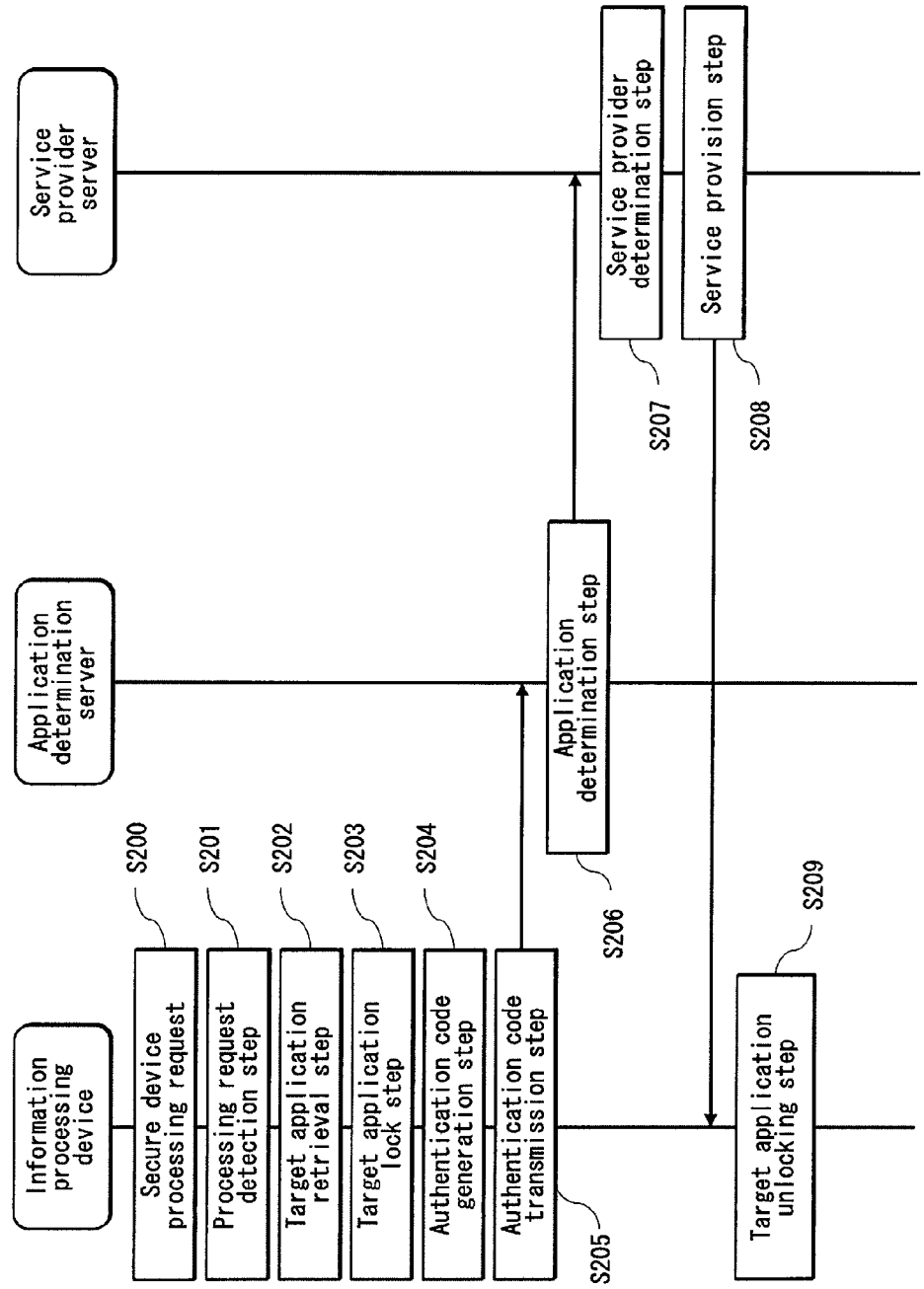
FIG. 14 is a sequence diagram showing prevention of secure device access by an unauthorized application in embodiment 3 of the present invention.

FIG. 14 shows a sequence for device access control according to embodiment 3 of the present invention.

The differences in configuration between the information processing device 120 in embodiment 1 and the information processing device 250 in embodiment 3 are as follows.

The difference in hardware configuration between embodiment 1 and embodiment 3 is the network interface in the secure device. The network interface driver 235 is the device driver that controls the network interface.

In the information processing device 120 in embodiment 1, the application identification unit 106 includes an application determination unit 112 that is a verification unit, whereas the application identification unit 236 in the information processing device 250 in embodiment 3 does not include an application determination unit that is a verification unit. Furthermore, the application identification unit 236 in embodiment 3 differs by including a transmission unit 241. Also, the network interface driver 235 in embodiment 3 is not provided with a device access control unit that is an execution unit.

Furthermore, the information processing device 250, application determination server 251, and service provider server 252 in embodiment 3 are connected by a network 253. The application determination server 251 is provided with an application determination unit 254 that is a verification unit. The service provider server 252 is provided with a service provider unit 255 and service provider determination unit 256 as execution units.

As an execution unit, the service provider unit 255 provides the information processing device 250 with services such as content distribution.

The service provider determination unit 256 determines whether it is acceptable to provide the information processing device 250 with services.

With reference to the sequence in FIG. 14, a description is provided for the steps by which the information processing device 250 receives services from the service provider server 252.

First, the following steps performed in the information processing device 250 are the same as in embodiment 1, and therefore a description thereof is omitted: secure device processing request (S200), processing request detection step (S201), target application retrieval step (S202), target application lock step (S203), authentication code generation step (S204), and target application unlocking step (S209).

During the authentication code transmission step (S205), the transmission unit 241 transmits a generated hash value (authentication code) via the network 253 to the application determination server 251. The application determination unit 254 in the application determination server 251 compares the transmitted hash value (authentication code) with a pre-stored hash value (authentication code) to determine whether an application is authorized. The application determination unit 254 then transmits the determination results to the service provider server 252 via the network 253 (S206).

The service provider determination unit 256 in the service provider server 252 receives the transmitted determination results.

If the determination results indicate an authorized application (S207), the service provider determination unit 256 instructs the service provider unit 255 to provide services to the information processing device 250. Upon being instructed to provide services, the service provider unit 255 provides services to the information processing device 250 via the network 253 (S208).

If the determination results indicate an unauthorized application (S207), the service provider determination unit 256 notifies the information processing device 250 by transmitting information indicating failure of the request (S208).

Note that the application determination server 251 and the service provider server 252 may be the same server.

Note also that the application determination server 251 and the service provider server 252 may be connected by a dedicated network to which the information processing device 250 is not connected. If the application determination server 251 and the service provider server 252 are connected by a dedicated network, the application determination server 251 notifies the service provider server 252 of the determination results via the dedicated network.

Apart from the above differences, embodiment 3 is the same as embodiment 1, and therefore further description is omitted.

In embodiment 3, the service provider server determines whether to provide the information processing device with services. This has the advantageous effect of making it possible for a service provider to verify software via a network.

Embodiment 4

Figure 15:
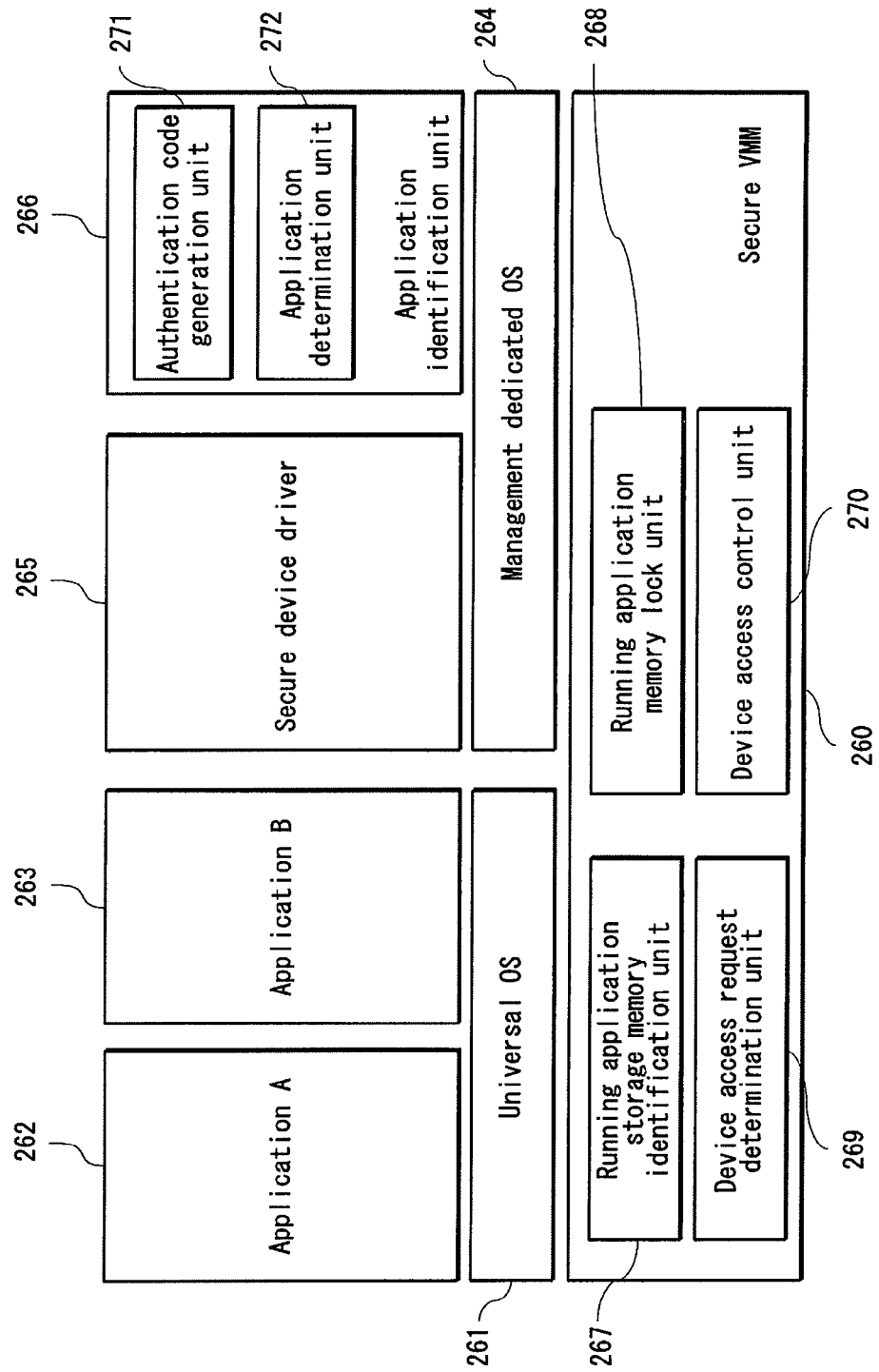
FIG. 15 shows a software configuration in embodiment 4 of the present invention.

FIG. 15 is a block diagram showing a software configuration of an information processing device according to embodiment 4 of the present invention.

Figure 16:
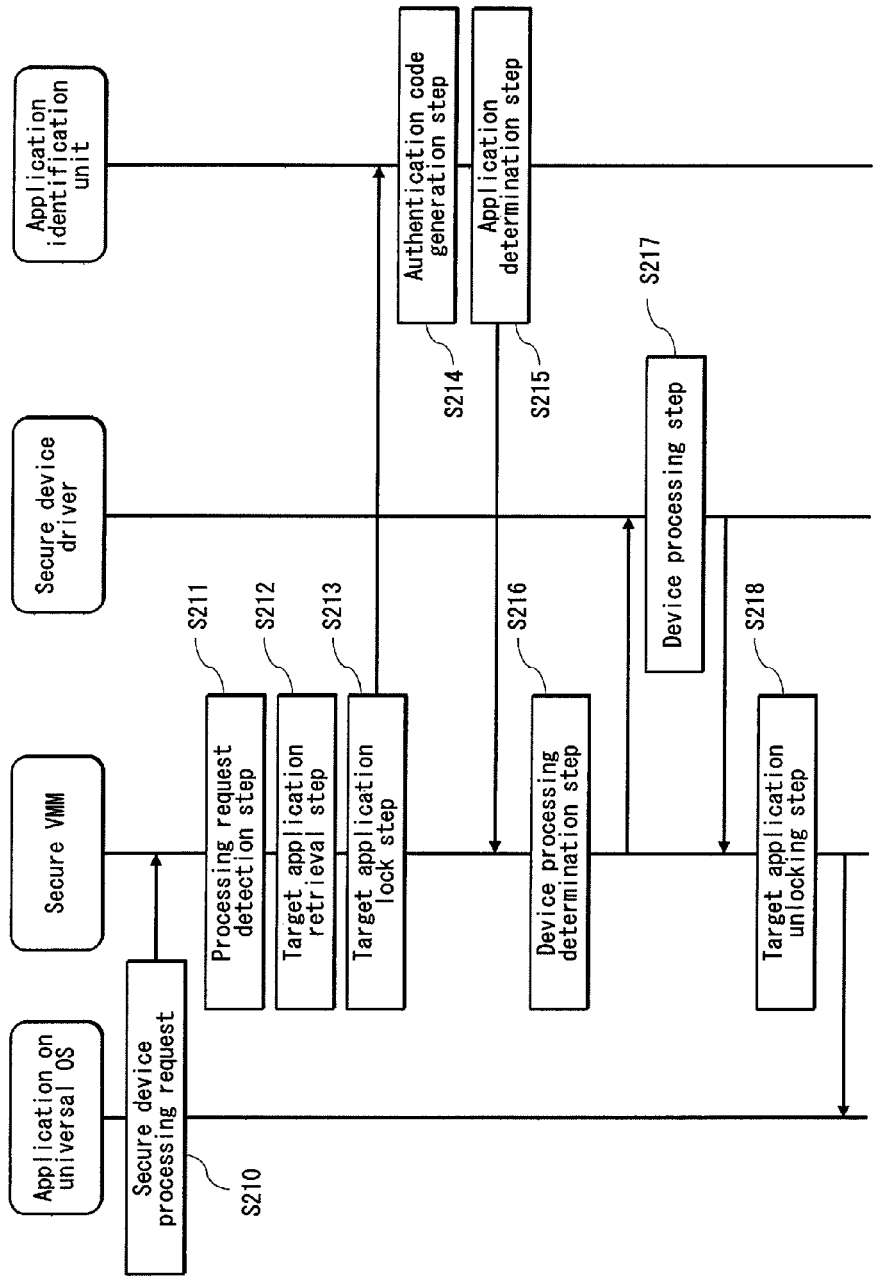
FIG. 16 is a sequence diagram showing prevention of secure device access by an unauthorized application in embodiment 4 of the present invention.

FIG. 16 shows a sequence for device access control according to embodiment 4 of the present invention.

The differences in configuration between the information processing device 120 in embodiment 1 and the information processing device in embodiment 4 are as follows.

In the information processing device 120 in embodiment 1, the secure device driver 105 is provided with the device access request determination unit 109 as a detection unit and the device access control unit 110 as an execution unit, whereas the secure device driver 265 in embodiment 4 is not provided with a device access request determination unit as a detection unit nor with a device access control unit as an execution unit. Furthermore, the secure VMM 260 in embodiment 4 is provided with a device access request determination unit 269 as a detection unit and a device access control unit 270 as an execution unit.

With reference to the sequence in FIG. 16, a description is provided of the steps whereby the information processing device in embodiment 4 allows only an authorized application to access the secure device.

In embodiment 1, the processing request detection step (S101) and the device processing determination step (S106) are performed in the secure device driver 105. In embodiment 4, on the other hand, a processing request detection step (S211) and a device processing determination step (S216) are performed in the secure VMM 260.

Apart from the above differences, embodiment 4 is the same as embodiment 1, and therefore further description is omitted.

Embodiment 4 differs from embodiment 1 in that the device access request determination unit 269 and device access control unit 270 exist within the secure VMM 260, not within the secure device driver 265. Accordingly, the information processing device in embodiment 4 can be operated without altering the secure device driver.

Embodiment 5

Figure 17:
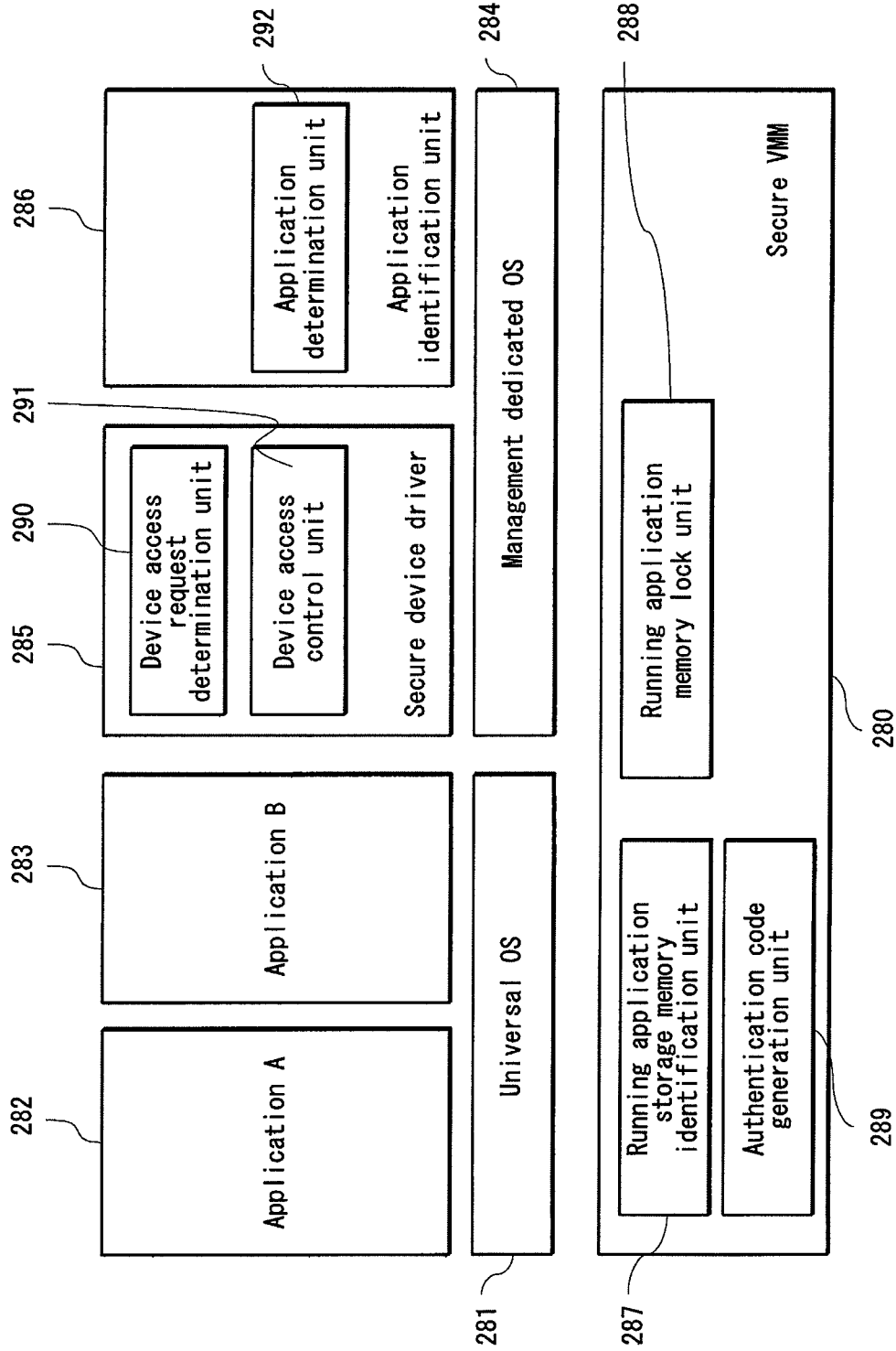
FIG. 17 shows a software configuration in embodiment 5 of the present invention.

FIG. 17 is a block diagram showing a software configuration of an information processing device according to embodiment 5 of the present invention.

Figure 18:
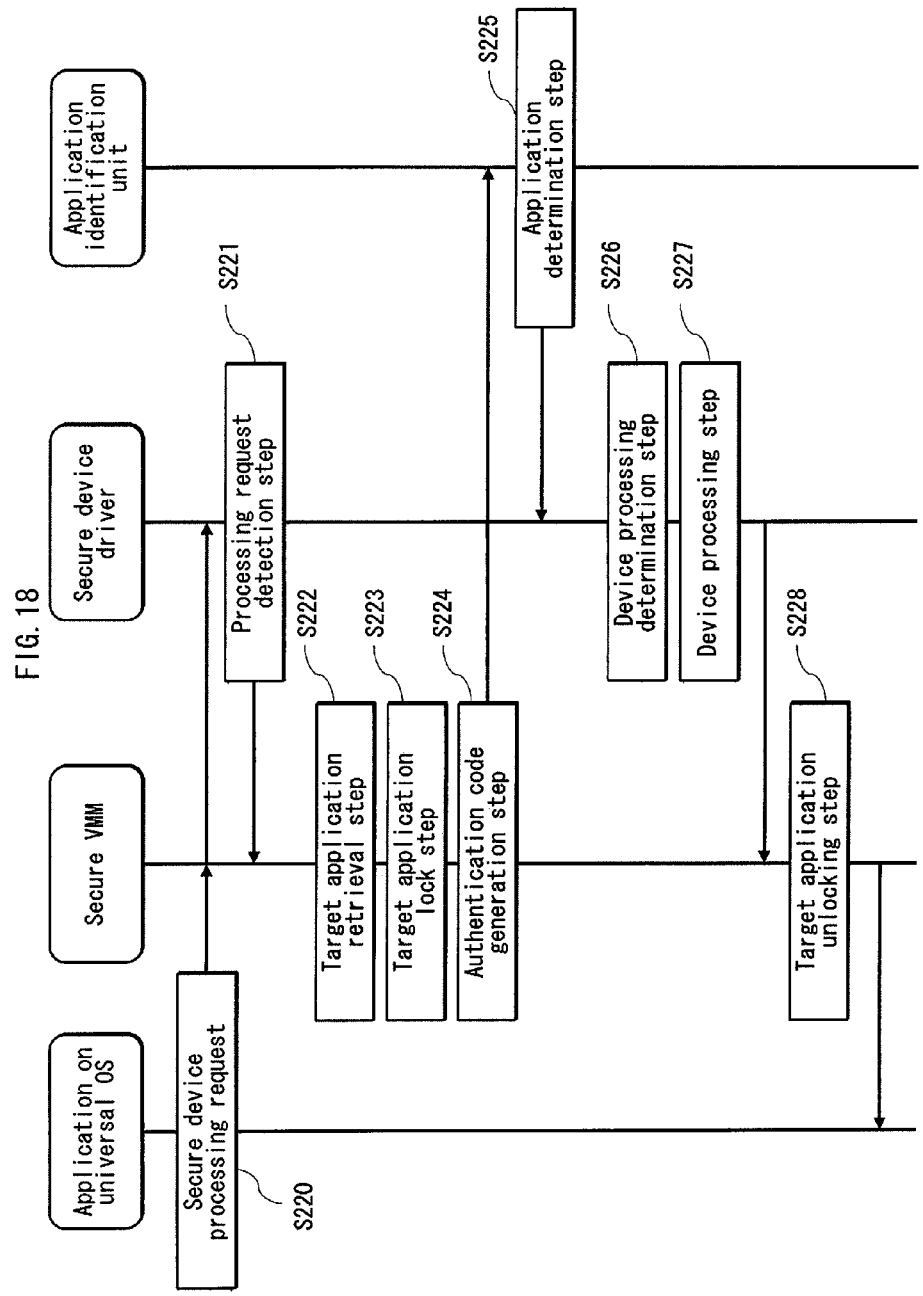
FIG. 18 is a sequence diagram showing prevention of secure device access by an unauthorized application in embodiment 5 of the present invention.
Figure 19:
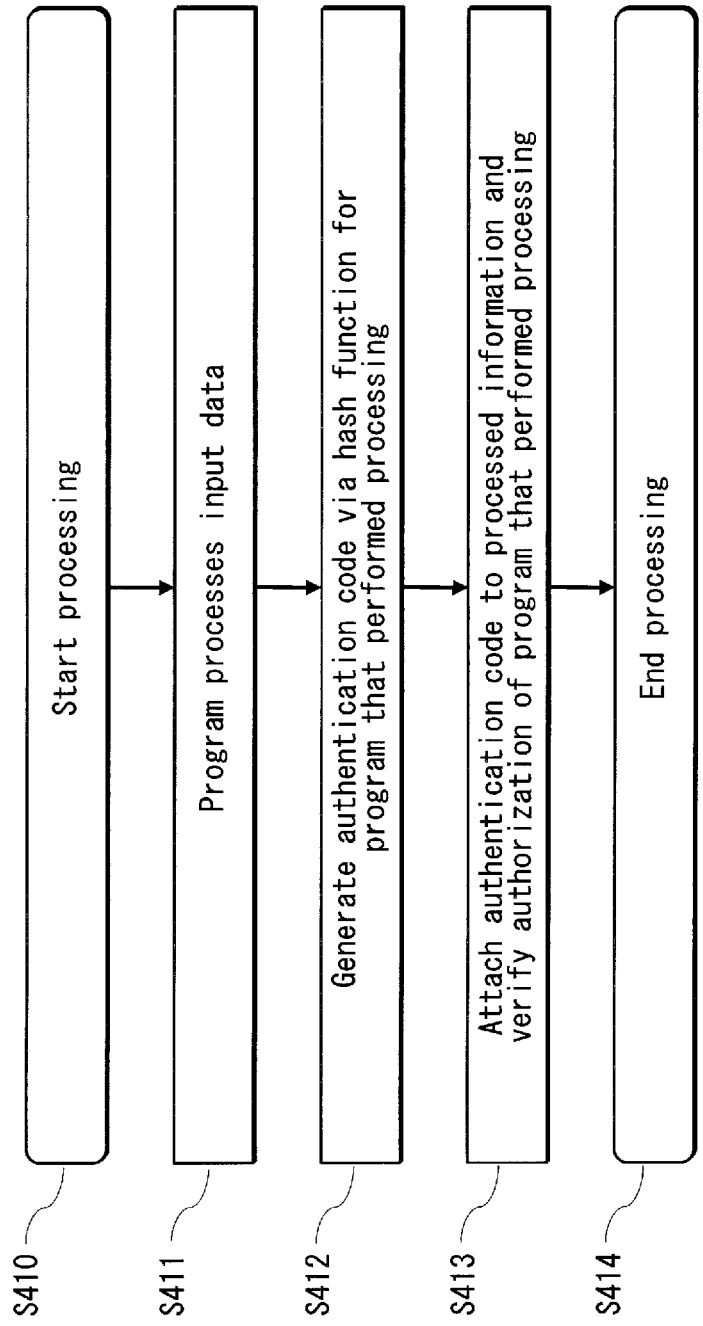
FIG. 19 is a sequence diagram of conventional verification that a program is authorized.
Figure 20:
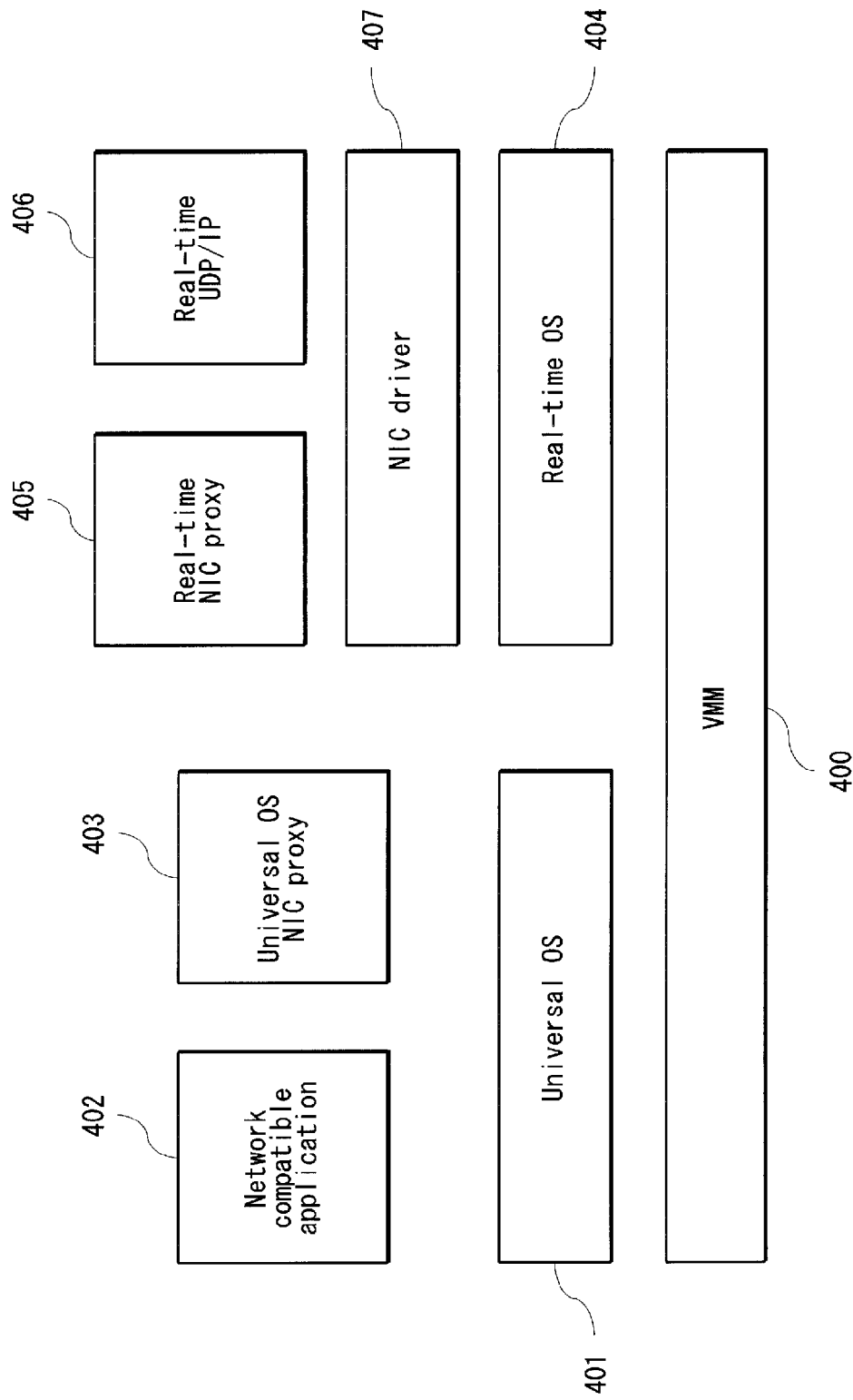
FIG. 20 shows a software configuration that processes data appropriately for each execution environment in a conventional OS virtualized execution environment.
Figure 21:
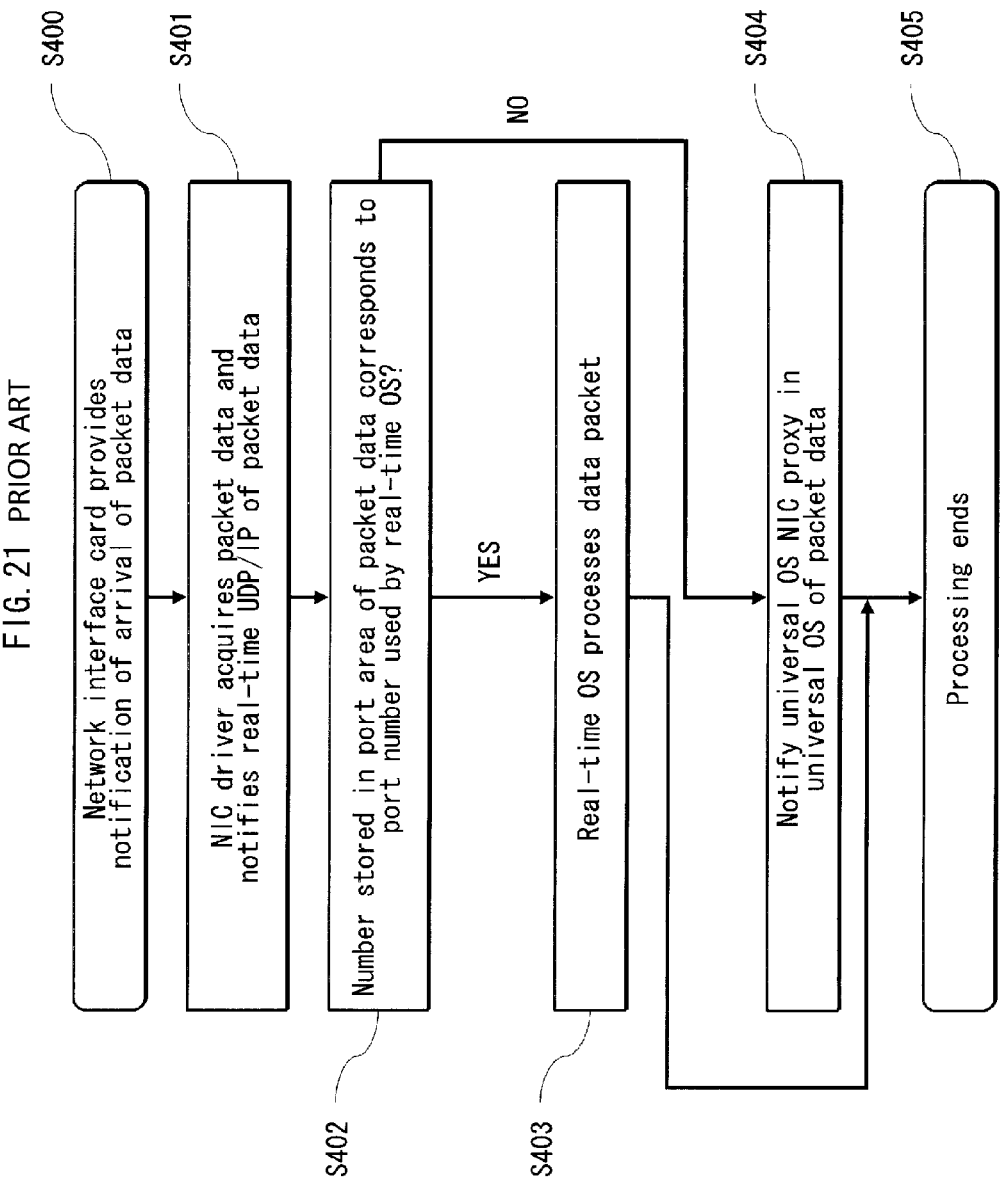
FIG. 21 is a sequence diagram showing processing of data appropriately for each execution environment in a conventional OS virtualized execution environment.

FIG. 18 shows a sequence for device access control according to embodiment 5 of the present invention.

The differences in configuration between the information processing device 120 in embodiment 1 and the information processing device in embodiment 5 are as follows.

In the information processing device 120 in embodiment 1, the application identification unit 106 is provided with an authentication code generation unit 111 as a verification unit, but the application identification unit 286 in embodiment 5 is not provided with an authentication code generation unit as a verification unit. Furthermore, the secure VMM 280 in embodiment 5 is provided with an authentication code generation unit 289 as a verification unit.

With reference to the sequence in FIG. 18, a description is provided of the steps whereby the information processing device in embodiment 5 allows only an authorized application to access the secure device.

In embodiment 1, the authentication code generation step (S104) is performed in the application identification unit 106. In embodiment 5, on the other hand, an authentication code generation step (S224) is performed in the secure VMM 280.

Apart from the above differences, embodiment 5 is the same as embodiment 1, and therefore further description is omitted.

In embodiment 5, unlike embodiment 1, the authentication code generation unit 289 exists within the secure VMM 280, not within the application identification unit 286. Therefore, notification of information from the running application storage memory identification unit 287 to the authentication code generation unit 289 takes place within the same module (i.e. the secure VMM 280). This has the advantageous effect that notification of information from the running application storage memory identification unit 287 to the authentication code generation unit 289 can be performed more quickly.

(Other Modifications)

(1) In the processing request detection step in the above embodiments, rather than detecting the processing request itself, a processing request can be determined to have been issued by referring to the command classification of the request or to the nature of the data processing.

(2) In the above embodiments, the processing request detection step may be performed only on operations during device initialization.

(3) In the above embodiments, whether detection during the processing request detection step is performed may be determined randomly based on a random number.

(4) In the above embodiments, whether detection during the processing request detection step is performed may depend on the number of times the device is accessed. For example, detection may be performed after the secure device driver is accessed ten times.

(5) In the above embodiments, a one-way function other than SHA1 may be used to generate the hash value in the authentication code generation step. For example, MD5, SHA256, AES, or DES may be used.

(6) In the above embodiments, the hash value in the authentication code generation step may be generated using only a part of the logical address space. For example, a hash value may be generated for only the code area of an application.

(7) In the above embodiments, multiple hash values may be generated in the authentication code generation step. For example, the logical memory space may be divided, and a hash value may be generated for each divided area.

(8) In the above embodiments, when backing up the information in the page table in the target application lock step, only part of the information may be backed up.

(9) In the above embodiments, the application determination unit may determine that only applications provided with a specific application license are unauthorized applications.

(10) In the above embodiments, the CPU may be provided with a protected mode and a regular mode. Furthermore, the CPU may be permitted to access the protected memory only when in protected mode.

(11) In the above embodiments, the protected memory and the secure device are controlled to be accessible only by software stored in the protected memory, but this configuration may be implemented by hardware. For example, the bus may be controlled so that the CPU may only access the protected memory and the secure device when a program in protected memory operates.

(12) In the above embodiments, the normal memory and the protected memory may be the same memory.

(13) In the above embodiments, a non-volatile storage device may store the universal OS. In this case, the universal OS is loaded into the normal memory by special firmware (programs) referred to as a Basic Input Output System (BIOS) or Initial Program Loader (IPL).

(14) In the above embodiments, a non-volatile storage device may store the secure device driver, the application identification unit, the management dedicated OS, or the secure VMM. In this case, the secure device driver, application identification unit, management dedicated OS, or secure VMM are stored after being encrypted with an encryption algorithm, for example a private key encryption method such as AES or an asymmetric key encryption method such as RSA. Each of the modules is then decrypted, loaded into the protected memory, and executed.

(15) In the above embodiments, the secure VMM may be stored in the normal memory. In this case, a tampering detection program, which is not shown in the figures and which is stored in the protected memory, may detect tampering with the secure VMM. Furthermore, this detection of tampering with the secure VMM may be performed in the following cases: when the secure VMM is loaded in normal memory; on a regular basis; on an irregular basis in accordance, for example, with a random number; or based on some sort of trigger.

(16) In the above embodiments, the secure VMM may be stored in the normal memory. In this case, a tampering detection program, which is not shown in the figures and which is stored in Read Only Memory (ROM) internal to the information processing device, may detect tampering with the secure VMM. Furthermore, this detection of tampering with the secure VMM may be performed in the following cases: when the secure VMM is loaded in normal memory; on a regular basis; on an irregular basis in accordance, for example, with a random number; or based on some sort of trigger.

(17) In the above embodiments, the privileged mode of the CPU is implemented using the CPU's Ring function, but other methods may be used. For example, a virtual domain (administrative domain and universal domain) function in a CPU that supports full virtualization may be used.

(18) In the above embodiments, the universal OS manages the page table of an application, but other methods may be used. For example, shadow paging in OS virtualization technology may be used for the secure VMM to manage the page tables.

Furthermore, in the above embodiments, the secure VMM refers to the page table for each application managed by the universal OS via the current page table. Specifically, a pointer pointing to the current page table is linked to the page table for the application, among the applications managed by the universal OS, that is currently being processed. However, the invention is not limited in this way. For example, when using shadow paging, the secure VMM copies the page table managed by the universal OS upon each switch between running application. In this case, since access to memory is controlled based on the page table stored by the secure VMM, the secure VMM can perform the same processing on the page table it has copied as the processing performed on the current page table in the above embodiments.

(19) In embodiment 2 and embodiment 3, the information processing device may send information to identify the information processing device to the application determination server along with the hash value (authentication code).

(20) In embodiment 2 and embodiment 3, a secure transmission channel may be used between the information processing device and the application determination server. For example, SSL may be used.

(21) In embodiment 2 and embodiment 3, the information transmitted from the information processing device to the application determination server may be protected using a digital signature. For example, a digital signature may be created for information to be transmitted using Trusted Platform Module (TPM) by the Trusted Computing Group (TCG), and the digital signature may be transmitted to the application determination server.

(22) In embodiment 2 and embodiment 3, the information processing device and the application determination server may perform mutual authentication using challenge-response processing.

(23) In the above embodiments, the CPU is permitted to access all of the entries in page tables corresponding to privilege information that is lower than the CPU's privileged mode, but the present invention is not limited in this way. For example, a privileged mode may be related to privilege information in a one-to-one correspondence, so that in a privileged mode of Ring 3, only entries having privilege information of Ring 3 can be accessed.

(24) Part or all of the constituent elements in the above embodiments may be implemented, insofar as possible, as software. By doing so, the amount of hardware that has to be placed on an integrated circuit can be reduced, thus improving the degree of integration.

(25) Part or all of the constituent elements in the above embodiments may be implemented, insofar as possible, as hardware. In this case, processing is faster than when implementing the constituent elements as software. This sort of implementation is particularly advantageous for processing that is expected to be fast for the sake of user convenience, such as saving or restoring.

(26) Depending on the degree of integration, a system LSI is also referred to as an IC, LSI, super LSI, or ultra LSI. It goes without saying that the present invention includes implementation on a system LSI with any of these degrees of integration. A Field Programmable Gate Array (FPGA), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of function blocks and components may naturally be accomplished using such technology. The application of biotechnology or the like is possible.

(27) The present invention may also be a computer readable recording medium such as a flexible disk, hard disk, CD-ROM, MO, DVD, DVD-ROM, DVD-RAM, BD (Blu-ray Disc), semiconductor memory, etc. on which a computer program or a digital signal is recorded. The present invention may also be the digital signal recorded on such a recording medium.

(28) The above embodiments and modifications may be combined with one another.

The method of controlling access to a secure device in the present invention locks the logical memory space in which an application is stored and generates a hash value for determination of authorization, thus yielding the advantageous effect of preventing access to the device by an unauthorized application that replaces the application. During data processing on the secure device, this method therefore has the advantageous effect of preventing operation of an unauthorized application.

The invention claimed is:

1. An information processing device comprising:
a hardware processor programmed to operate as:
a virtual machine operable to cause an application, which accesses a predetermined device, to operate in a work area;
a detection unit operable to detect, from the virtual machine, an access request to access the predetermined device via the application;

a verification unit operable to verify authorization of the application; and a virtual machine monitor operable to manage the virtual machine, the verification unit, and the detection unit and to switch between managing the application in one of a writeable state and a non-writable state, wherein upon detecting the access request, the detection unit notifies the virtual machine monitor of the detection, upon receiving notification from the detection unit, the virtual machine monitor switches to managing the application in the non-writable state and notifies the verification unit of the switch, and upon receiving notification from the virtual machine monitor, the verification unit verifies authorization of the application.

2. The information processing device of claim 1, further comprising an execution unit that accesses the predetermined device via the application when the verification unit determines that the application is authorized.

3. The information processing device of claim 2, wherein after the execution unit finishes accessing the predetermined device via the application, the virtual machine monitor switches back to managing the application in the writable state.

4. The information processing device of claim 1, wherein the virtual machine monitor manages management information corresponding to the application, the management information including privilege information that indicates one or more subjects having authority to rewrite the management information, and when the privilege information indicates that the virtual machine is a subject that can rewrite the application, the virtual machine monitor switches to managing the application in the non-writable state by rewriting the privilege information to exclude the virtual machine from the subjects that can rewrite the application.

5. The information processing device of claim 4, wherein the virtual machine monitor excludes the virtual machine from the subjects that can rewrite the application by rewriting the privilege information, so that instead of including the virtual machine and the virtual machine monitor as the subjects that can rewrite the application, the privilege information limits the subjects that can rewrite the application to the virtual machine monitor.

6. The information processing device of claim 1, wherein the predetermined device is an SD card.

7. The information processing device of claim 1, wherein the predetermined device is an external content server that provides content to the information processing device.

8. An information processing device comprising:
a hardware processor programmed to operate as:
a virtual machine operable to cause an application, which accesses a predetermined device, to operate in a work area;
a detection unit operable to detect, from the virtual machine, an access request to access the predetermined device via the application; and
a virtual machine monitor operable to manage the virtual machine and the detection unit and to switch between managing the application in one of a writeable state and a non-writable state, wherein
upon detecting the access request, the detection unit notifies the virtual machine monitor of the detection, and
upon receiving notification from the detection unit, the virtual machine monitor (i) switches to managing the application in the non-writable state and notifies an external device provided with a verification unit of the switch and (ii) causes the verification unit in the external device to verify authorization of the application.

9. An information processing device comprising:
a hardware processor programmed to operate as:
a virtual machine operable to cause an application, which accesses a predetermined device, to operate in a work area;
a detection unit operable to detect, from the virtual machine, an access request to access the predetermined device via the application;
a virtual machine monitor operable to manage the virtual machine and the detection unit and to switch between managing the application in one of a writeable state and a non-writable state; and
a transmission unit operable to transmit to an external device that is provided with an execution unit and that provides services, wherein
upon detecting the access request, the detection unit notifies the virtual machine monitor of the detection,
upon receiving notification from the detection unit, the virtual machine monitor switches to managing the application in the non-writable state, and
when the application is determined to be authorized after being switched to management in the non-writable state, the transmission unit receives the services provided by the execution unit in the external device.

10. A control method for controlling an information processing device that comprises:
a virtual machine operable to cause an application, which accesses a predetermined device, to operate in a work area;
a detection unit operable to detect, from the virtual machine, an access request to access the predetermined device via the application;
a verification unit operable to verify authorization of the application; and
a virtual machine monitor operable to manage the virtual machine, the verification unit, and the detection unit, wherein
upon detecting the access request, the detection unit notifies the virtual machine monitor of the detection,
upon receiving notification from the detection unit, the virtual machine monitor switches to managing the application in a non-writable state and notifies the verification unit of the switch, and
upon receiving notification from the virtual machine monitor, the verification unit verifies authorization of the application.

11. A non-transitory computer-readable recording medium on which is recorded a control program for controlling an information processing device, the control program causing the information processing device to operate as:
a virtual machine operable to cause an application, which accesses a predetermined device, to operate in a work area;
a detection unit operable to detect, from the virtual machine, an access request to access the predetermined device via the application;
a verification unit operable to verify authorization of the application; and
a virtual machine monitor operable to manage the virtual machine, the verification unit, and the detection unit,
the control program comprising the steps of:
notifying the virtual machine monitor when the detection unit detects an access request;
causing the virtual machine monitor to switch to managing the application in a non-writable state and causing the virtual machine monitor to notify the verification unit of the switch; and causing the verification unit, which receives notification from the virtual machine monitor, to verify authorization of the application.

12. An integrated circuit used in an information processing device, the integrated circuit comprising:
- a hardware processor programmed to operate as:
- a virtual machine operable to cause an application, which accesses a predetermined device, to operate in a work area;
- a detection unit operable to detect, from the virtual machine, an access request to access the predetermined device via the application;
- a verification unit operable to verify authorization of the application; and
- a virtual machine monitor operable to manage the virtual machine, the verification unit, and the detection unit, wherein
- upon detecting the access request, the detection unit notifies the virtual machine monitor of the detection,
- upon receiving notification from the detection unit, the virtual machine monitor switches to managing the application in a non-writable state and notifies the verification unit of the switch, and
- upon receiving notification from the virtual machine monitor, the verification unit verifies authorization of the application.

* * * * *